United States Patent
Ray et al.

(10) Patent No.: US 12,355,478 B2
(45) Date of Patent: Jul. 8, 2025

(54) PROGRAMMABLE RF FRONT END FOR WIDEBAND ADC-BASED RECEIVER

(71) Applicant: The Boeing Company, Chicago, IL (US)

(72) Inventors: Gary A. Ray, Issaquah, IA (US); Alec Adams, Seattle, WA (US)

(73) Assignee: The Boeing Company, Arlington, VA (US)

( * ) Notice: Subject to any disclaimer, the term of this patent is extended or adjusted under 35 U.S.C. 154(b) by 590 days.

(21) Appl. No.: 17/568,801

(22) Filed: Jan. 5, 2022

(65) Prior Publication Data

US 2022/0239322 A1 Jul. 28, 2022

Related U.S. Application Data

(60) Provisional application No. 63/142,160, filed on Jan. 27, 2021.

(51) Int. Cl.
| | |
|---|---|
| H04B 1/30 | (2006.01) |
| H04B 1/00 | (2006.01) |
| H04B 1/10 | (2006.01) |

(52) U.S. Cl.
CPC ............. H04B 1/30 (2013.01); H04B 1/0078 (2013.01); H04B 1/0096 (2013.01); H04B 1/10 (2013.01); H04B 2001/307 (2013.01)

(58) Field of Classification Search
CPC ...... H04B 1/30; H04B 1/0078; H04B 1/0096; H04B 1/10; H04B 2001/307
See application file for complete search history.

(56) References Cited

U.S. PATENT DOCUMENTS

| | | | | |
|---|---|---|---|---|
| 5,805,108 A | * | 9/1998 | Lennen | G01S 19/32 342/357.68 |
| 5,956,620 A | * | 9/1999 | Lazaris-Brunner | H04B 7/18515 455/12.1 |
| 5,966,666 A | * | 10/1999 | Yamaguchi | H03D 7/163 455/76 |
| 6,115,409 A | * | 9/2000 | Upadhyay | H01Q 3/2605 375/267 |

(Continued)

Primary Examiner — Jinsong Hu
Assistant Examiner — Rui M Hu
(74) Attorney, Agent, or Firm — Harrity & Harrity, LLP

(57) ABSTRACT

A receiver includes an antenna block configured to transduce impinging electromagnetic signals into electrical signals; a signal conditioning block configured to condition electrical signals received from the antenna block; and a down-converter block configured to down-convert conditioned electrical signals received from the signal conditioning block. The down-converter block comprises a plurality of signal channels. The receiver further includes a plurality of analog-to-digital converters (ADCs) respectively connected to the signal channels of the down-converter block; and a field-programmable gate array (FPGA). The FPGA is configured to program the down-converter block by selecting a set of mixer frequencies and a set of bandwidths designed to remove interference signals in each signal channel. The selections are calculated to mitigate reductions in dynamic range in the ADCs due to interference. The FPGA is further configured to process digital signals received from the ADCs after the down-converter block has removed the interference signals.

20 Claims, 19 Drawing Sheets

(56) References Cited

U.S. PATENT DOCUMENTS

| | | | | |
|---|---|---|---|---|
| 6,968,173 B2* | 11/2005 | Cowley | | H03L 7/099 |
| | | | | 455/340 |
| 8,219,059 B2* | 7/2012 | Pera | | H04B 1/0075 |
| | | | | 455/314 |
| 8,340,218 B2* | 12/2012 | Drennen, III | | H04B 1/0003 |
| | | | | 375/316 |
| 9,588,212 B1* | 3/2017 | Bradley | | H04B 17/21 |
| 9,768,812 B1* | 9/2017 | Tsui | | H04B 17/0085 |
| 9,991,914 B1* | 6/2018 | Lee | | H04B 1/0475 |
| 10,289,785 B1 | 5/2019 | Panou | | |
| 10,389,395 B1* | 8/2019 | Hovda | | H04B 1/1018 |
| 10,454,724 B2* | 10/2019 | Ross | | H03H 19/002 |
| 10,484,211 B2* | 11/2019 | Rogers | | H04L 25/03828 |
| 10,680,615 B1 | 6/2020 | Schultz et al. | | |
| 10,838,908 B2 | 11/2020 | Swarbrick et al. | | |
| RE49,903 E* | 4/2024 | Yi | | H04J 1/12 |
| 2004/0062216 A1* | 4/2004 | Nicholls | | H04B 1/71 |
| | | | | 370/320 |
| 2005/0136880 A1* | 6/2005 | Subasic | | H04B 1/0071 |
| | | | | 455/334 |
| 2006/0281433 A1* | 12/2006 | Yang | | H04B 1/26 |
| | | | | 455/323 |
| 2008/0031388 A1* | 2/2008 | Rabbath | | H04B 1/28 |
| | | | | 375/346 |
| 2009/0231197 A1* | 9/2009 | Richards | | H01Q 3/2682 |
| | | | | 342/377 |
| 2009/0291658 A1* | 11/2009 | Castle | | H04B 1/1638 |
| | | | | 455/255 |
| 2010/0074303 A1* | 3/2010 | Tanaka | | H04B 1/713 |
| | | | | 375/E1.033 |
| 2010/0119012 A1* | 5/2010 | Pal | | H04B 1/0092 |
| | | | | 375/324 |
| 2010/0244903 A1* | 9/2010 | Easton | | H03D 7/163 |
| | | | | 327/156 |
| 2011/0026509 A1* | 2/2011 | Tanaka | | H04L 27/2647 |
| | | | | 370/338 |
| 2011/0117870 A1* | 5/2011 | Pera | | H04B 1/0075 |
| | | | | 455/313 |
| 2011/0122929 A1* | 5/2011 | Razzell | | H04B 1/7183 |
| | | | | 375/354 |
| 2013/0101012 A1* | 4/2013 | Toosi | | H04L 5/06 |
| | | | | 375/350 |
| 2014/0267925 A1* | 9/2014 | Koroglu | | H04N 21/426 |
| | | | | 348/726 |
| 2014/0267928 A1* | 9/2014 | Coban | | H03L 7/1974 |
| | | | | 348/731 |
| 2015/0011172 A1* | 1/2015 | Reinhardt | | H04B 1/1027 |
| | | | | 455/296 |
| 2015/0171902 A1* | 6/2015 | Fleischer | | H04B 17/19 |
| | | | | 375/285 |
| 2016/0043822 A1* | 2/2016 | Yi | | H04B 1/006 |
| | | | | 370/329 |
| 2016/0218673 A1* | 7/2016 | Anderson | | H04B 15/06 |
| 2016/0380668 A1* | 12/2016 | Aoki | | H04L 5/143 |
| | | | | 370/278 |
| 2018/0011180 A1* | 1/2018 | Warnick | | H01Q 21/064 |
| 2018/0031689 A1* | 2/2018 | Ben-Ari | | H01Q 13/04 |
| 2018/0081047 A1* | 3/2018 | Gander | | H04B 17/0085 |
| 2018/0175897 A1* | 6/2018 | Tang | | H04B 1/30 |
| 2018/0267141 A1* | 9/2018 | Wallen | | G01S 7/2921 |
| 2018/0278441 A1* | 9/2018 | Ross | | H04L 25/03114 |
| 2018/0278442 A1* | 9/2018 | Rogers | | H04L 25/03828 |
| 2019/0158134 A1* | 5/2019 | Espana Fresno | | G01R 23/175 |
| 2020/0021323 A1* | 1/2020 | Cyzs | | H04B 1/123 |
| 2021/0203422 A1* | 7/2021 | Gale | | H01Q 3/267 |
| 2021/0258025 A1* | 8/2021 | Belkin | | H04B 1/0096 |
| 2021/0345120 A1* | 11/2021 | Montalvo | | H04W 24/02 |
| 2022/0029721 A1* | 1/2022 | Jackson | | H04L 7/0079 |

* cited by examiner

PROGRAMMABLE RF FRONT END FOR WIDEBAND ADC-BASED RECEIVER

RELATED PATENT APPLICATION

This application claims the benefit, under Title 35, Code, Section 119 (e), of U.S. Provisional United States Application No. 63/142,160 filed on Jan. 27, 2021.

BACKGROUND

The technology disclosed herein generally relates to wideband receivers and, in particular, relates to wideband receivers that employ oscillators to create sample clock signals for analog-to-digital converters (ADCs).

Wideband receivers use high-rate ADCs in order to capture a wide signal bandwidth or even a direct radiofrequency (RF) down conversion to digital. This has many advantages since the receive process becomes purely digital and thus signal fidelity can be improved compared to analog methods. The performance of an ADC is characterized in part by its bandwidth and signal-to-noise ratio (SNR). The bandwidth of an ADC is characterized primarily by its sampling rate. ADCs are chosen to match the bandwidth and required SNR of the signal to be digitized.

Dynamic range is a common performance metric for ADCs in applications such as radar and wireless communications. To efficiently utilize the dynamic range of an ADC, the amplitude of the input signal should be adjusted to the reference voltage of the ADC. The effective number of bits (ENOB) is a measure of the dynamic range of an ADC. The resolution of an ADC is specified by the number of bits used to represent the analog value. Ideally, a 16-bit ADC may have an effective number of bits in a range of 12 to 14. This is due to the fact that real signals have noise and real circuits are imperfect and introduce additional noise and distortion. Those imperfections reduce the number of bits of accuracy in the ADC.

Recent ADC technology has achieved greater than 2 GHz of instantaneous bandwidth with an effective number of bits (ENOB) in a range of 12 to 14 in an integrated and packaged form called "RF System on Chip" (hereinafter "RFSoC"). A typical RFSoC includes a field-programmable gate array (FPGA) configured to process digital signals. In addition, one RFSoC might have 8 to 16 wideband integrated ADCs which can all be used simultaneously to cover a very wide RF bandwidth. However, this performance also poses three challenges with respect to dynamic range. First, wideband ADCs typically have smaller available input voltage swings and therefore reduced dynamic range when compared to their narrowband counterparts. Second, as the bandwidth increases, more signals are potentially observed, which means larger voltage swings into the ADC, further stressing the dynamic range (e.g., reducing the effective dynamic range). Third, intentional interfering signals meant to disrupt the digital receiver have more impact, compared to narrowband ADCs.

Existing solutions might try to notch out a limited number of interferers, but this approach is limited in the number of interferers that can be handled. More specifically, previous solutions require creating notch filters for each interferer and so are limited in the number of notches available.

SUMMARY

The technology disclosed in detail below solves the problem of inadequate wideband ADC dynamic range by incorporating a programmable RF front end that enables the ADCs to avoid incoming interfering signals while still providing almost complete wideband frequency coverage. The approach adopted herein allows the use of multiple ADCs to take advantage of wideband performance and yet solves the problems presented by reduced dynamic range by allowing the RF front end to be programmed using information about the interfering signals. This approach allows for a more flexible allocation of ADC resources in order to obtain the best (highest) dynamic range available.

In accordance with one proposed implementation, the programmable RF front end is employed in an RFSoC-based receiver system having one or more RFSoCs configured to process digital signals output by one or more pluralities (e.g., banks) of ADCs. The programmable front end allows programming of each signal channel (hereinafter "channel"). For example, each RFSoC may have eight ADCs, in which case each RFSoC has eight channels, one channel per ADC. Each channel consists of a respective RF signal path from: (1) an antenna; (2) to a selection of one of a set of tunable bandpass filters with fixed bandwidths; (3) to baseband down-conversion; (4) to a respective ADC within the RFSoC. This arrangement enables the FPGA of the RFSoC to select a set of mixer frequencies and a set of bandwidths for signal processing in each channel using the ADCs in order to avoid the dynamic range problems posed by a set of impinging interfering signals.

Although a programmable RF front-end design and algorithms for avoiding interference will be described in some detail below, one or more of those embodiments may be characterized by one or more of the following aspects.

One aspect of the subject matter disclosed in some detail below is a receiver comprising: an antenna block configured to transduce impinging electromagnetic signals into electrical signals; a signal conditioning block connected and configured to condition electrical signals received from the antenna block; a down-converter block connected and configured to down-convert conditioned electrical signals received from the signal conditioning block, the down-converter block comprising a plurality of signal channels; a plurality of ADCs respectively connected to the plurality of signal channels of the down-converter block; and an FPGA. The FPGA is connected and configured to program the down-converter block by selecting a set of mixer frequencies and a set of bandwidths designed to remove interference signals in each signal channel. The selections are calculated to mitigate reductions in dynamic range in the ADCs due to the interference signals. The FPGA is further connected and configured to process digital signals received from the plurality of ADCs after the down-converter block has removed the interference signals.

Another aspect of the subject matter disclosed in some detail below is a method for processing signals from an antenna using a plurality of signal channels respectively connected to a plurality of ADCs, the signals being processed by a FPGA connected to the plurality of ADCs. The method comprises: (a) determining the frequencies of interference signals; (b) executing an interference reduction algorithm that selects a set of mixer frequencies and a set of bandwidths designed to remove the interference signals in each signal channel, the selections being calculated to mitigate reductions in dynamic range in the ADCs due to the interference signals; and (c) processing digital signals received from the plurality of ADCs after the interference signals have been removed in the signal channels.

In accordance with one proposed implementation, steps (b) and (c) are performed by an FPGA that is connected to receive digital signals from the ADC. Step (b) comprises generating filter selection logic signals and mixer frequency selection logic signals in dependence on the frequencies of interference signals. The filter selection logic signals representing selected filters are output from the FPGA to respective switch filters in the plurality of signal channels. The mixer frequency selection logic signals representing the selected mixer frequencies are output from the FPGA to respective programmable frequency synthesizers. Respective oscillator signals having the selected mixer frequencies are then output from the programmable frequency synthesizers to respective mixers in the plurality of signal channels.

A further aspect of the subject matter disclosed in some detail below is a down-converter block comprising a plurality of signal channels arranged in parallel, wherein each signal channel comprises a plurality of series-connected components, the series-connected components comprising a mixer, a switch filter connected to the mixer, a down-conversion mixer connected to the switch filter, an image rejection low-pass filter connected to the down-conversion mixer; and an amplifier connected to the image rejection low-pass filter. The switch filter comprises: a first switch connected to the mixer, the first switch being configured to change from a first state to a second state in response to receipt of a first filter selection logic signal by the switch filter; a second switch connected to the down-conversion mixer, the second switch being configured to change from a first state to a second state in response to receipt of the first filter selection logic signal by the switch filter; a first bandpass filter having a first bandwidth, the first bandpass filter connecting the second switch to the first switch when the first and second switches are in the first states; and a second bandpass filter having a second bandwidth, the second bandpass filter connecting the second switch to the first switch when the first and second switches are in the second states.

Other aspects of a programmable RF front-end design and algorithms for avoiding interference in a wideband ADC-based receiver are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of a programmable RF front-end design and algorithms for avoiding interference in a wideband ADC-based receiver are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A wideband ADC-based receiver in accordance with one embodiment has the following features: (1) usage of multiple ADCs to match where the interference is absent, rather than notch out where interference is present; (2) a programmable RF front end which is configured to handle multiple interfering signals and dynamic range reduction when using sets of wideband ADCs; and (3) an efficient algorithm that avoids interfering signals while providing near-optimal frequency coverage. These features provide many benefits, including size, weight, and power (SWAP), cost, and performance advantages for any wideband all-digital receivers, especially for the reception of radar and communication signals under difficult interference conditions. Previous solutions require creating notch filters for each interferer and so are limited in the number of notches available. The solution proposed herein is able to handle any number of interferers while trading off frequency coverage.

Figure 1:
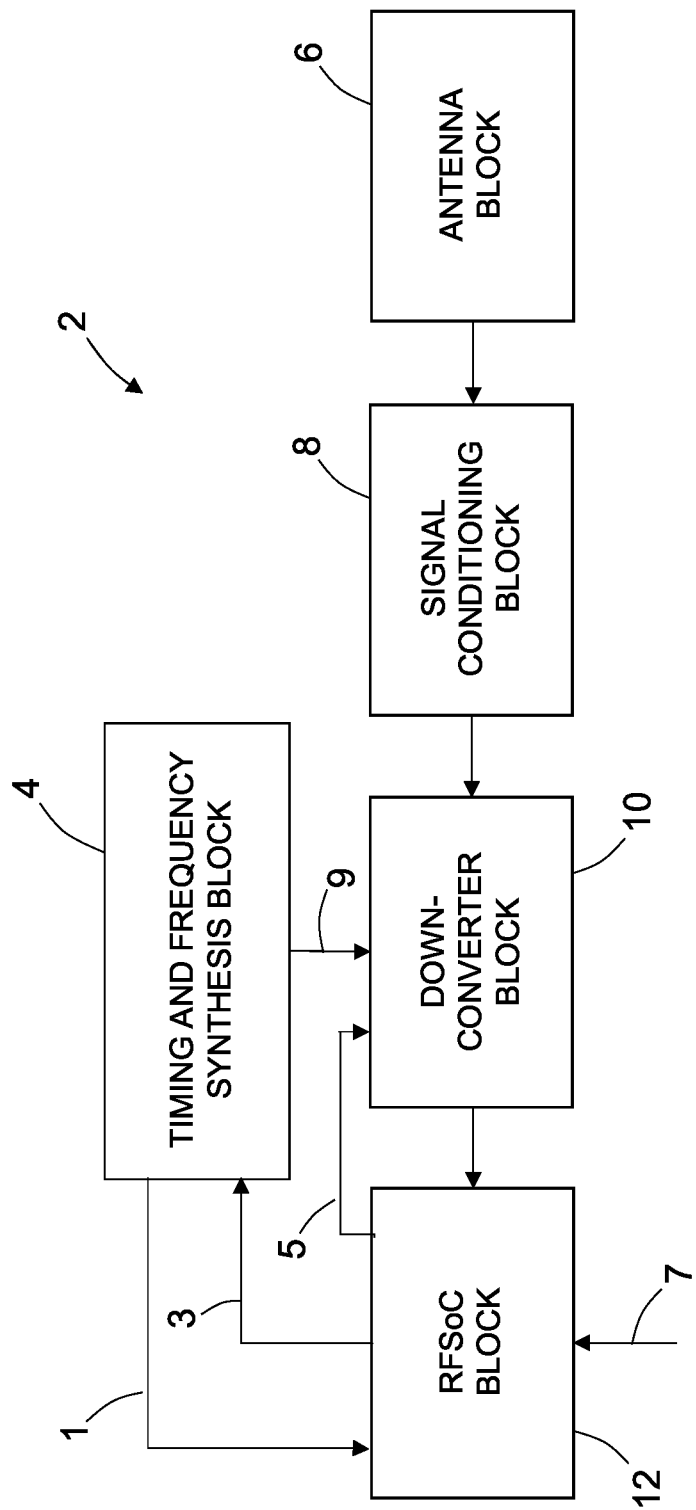
FIG. 1 is a block diagram identifying circuitry blocks of a wideband ADC-based receiver having a programmable RF front end in accordance with one embodiment.

FIG. 1 is a block diagram identifying circuitry blocks of a wideband ADC-based receiver 2 in accordance with one embodiment. In the example depicted in FIG. 1, the wideband ADC-based receiver 2 includes an antenna block 6 that transduces impinging electromagnetic signals into electrical signals, a signal conditioning block 8 that conditions electrical signals received from the antenna block 6, and a down-converter block 10 that down-converts conditioned electrical signals received from the signal conditioning block 8. In signal processing, a down-converter converts a band-limited signal to a lower frequency signal at a lower sampling rate in order to simplify the subsequent radio stages.

In the example depicted in FIG. 1, the wideband ADC-based receiver 2 further includes an RFSoC block 12 comprising of a plurality of RFSoCs (hereinafter "a set of RFSoCs"). The RFSoC block 12 receives down-converted signals from the down-converter block 10. The RFSoC block also receives interference information 7 characterizing incoming interfering signals from a source of interfering signal information. This information is used to program the programmable RF front end (or more specifically, down-converter block 10) in order to avoid incoming interfering signals while still providing almost complete wideband frequency coverage.

The wideband ADC-based receiver 2 depicted in FIG. 1 further includes a timing and frequency synthesis block 4 which provides clock signals 1 to RFSoC block 12. The timing and frequency synthesis block 4 is also configured to output oscillator signals 9 having selected mixer frequencies to the down-converter block 10 in response to receipt of mixer frequency selection logic signals 3 from RFSoC block 12. The RFSoC block 12 is also configured to output filter selection logic signals 5 to the down-converter block 10. Based on the selected mixer frequencies and selected filters, the down-converter block 10 mixes and filters the conditioned signals received from signal conditioning block 8 in each channel in a manner that fits the signals within the bandwidth of the ADC (not shown in FIG. 1, but see ADCs 56 in FIG. 2B) to which the particular channel is connected.

Figure 2A:
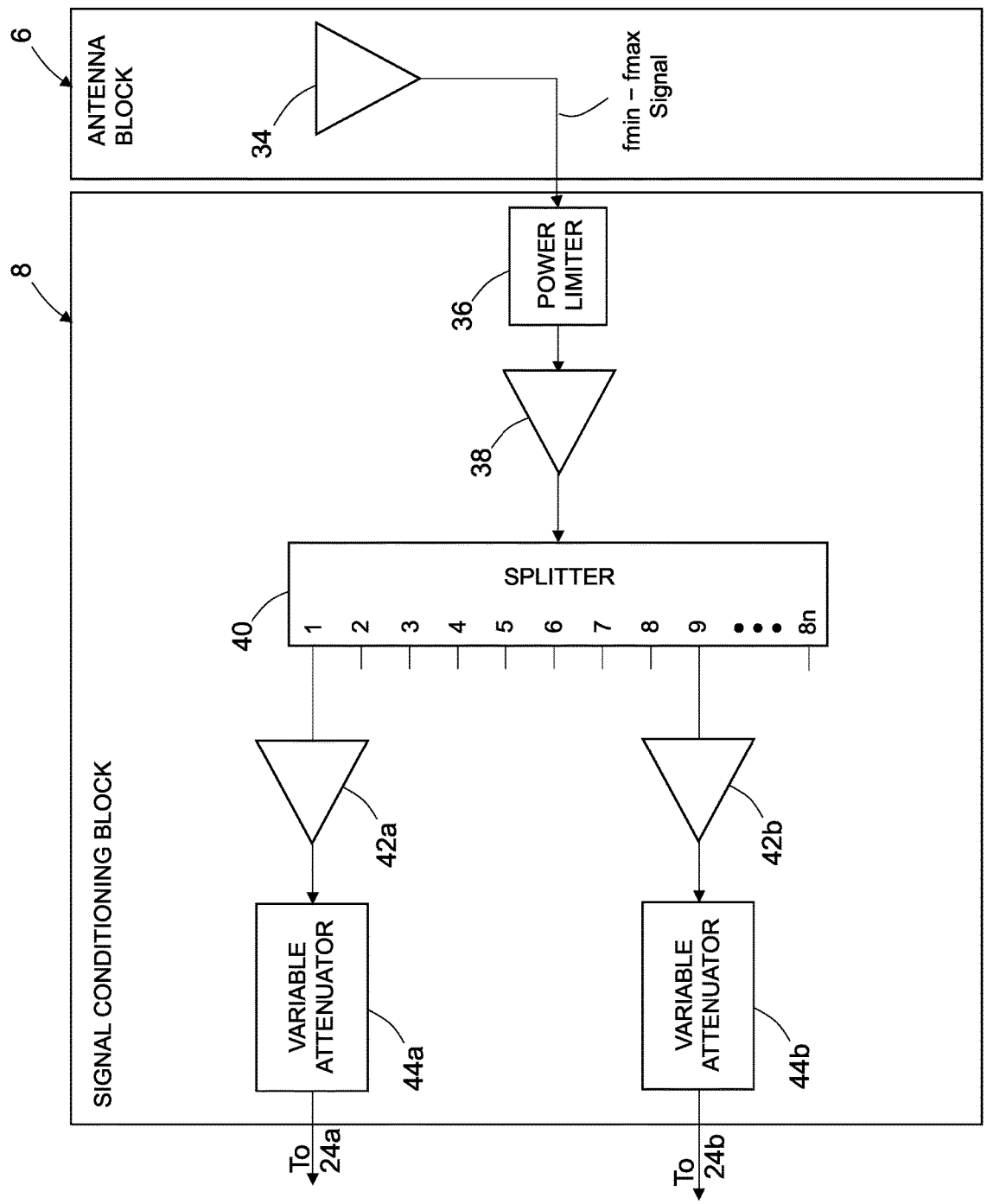
FIG. 2A is a block diagram identifying some components in accordance with one proposed implementation of the antenna block and signal conditioning block identified in FIG. 1.
Figure 2B:
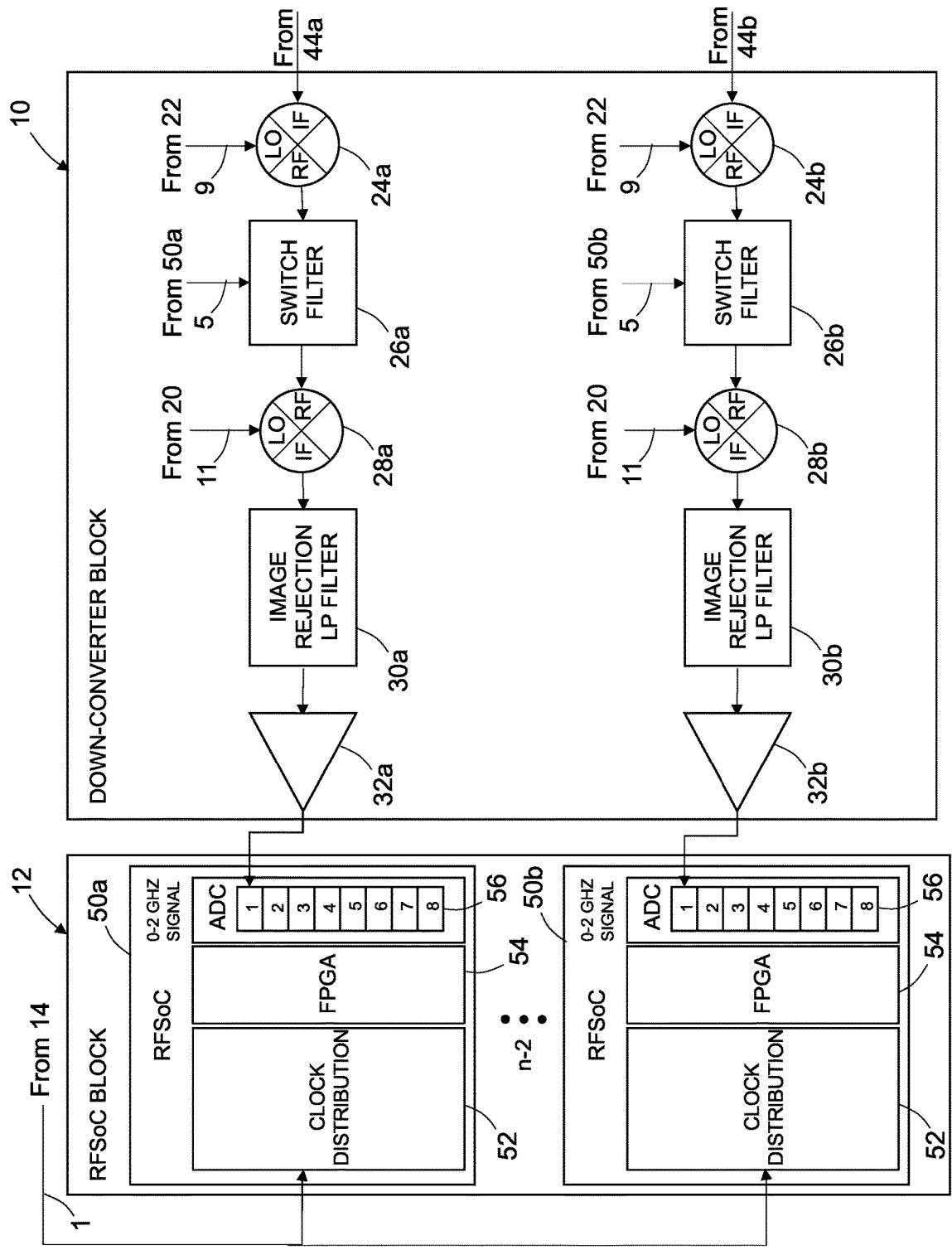
FIG. 2B is a block diagram identifying some components in accordance with one proposed implementation of the RFSoC block and down-converter block identified in FIG. 1.
Figure 2C:
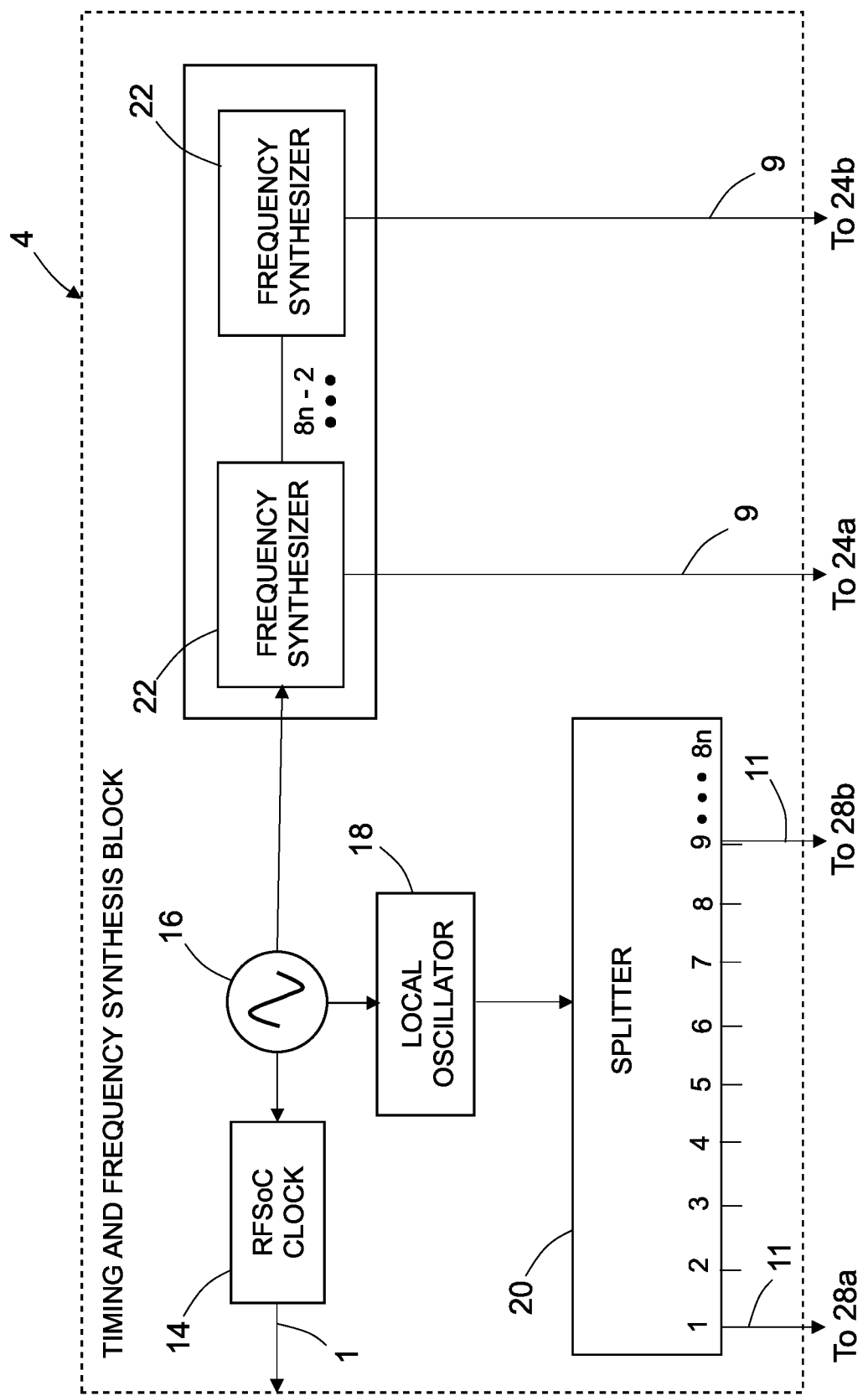
FIG. 2C is a block diagram identifying some components in accordance with one proposed implementation of the timing and frequency synthesis block identified in FIG. 1.
Figure 4:
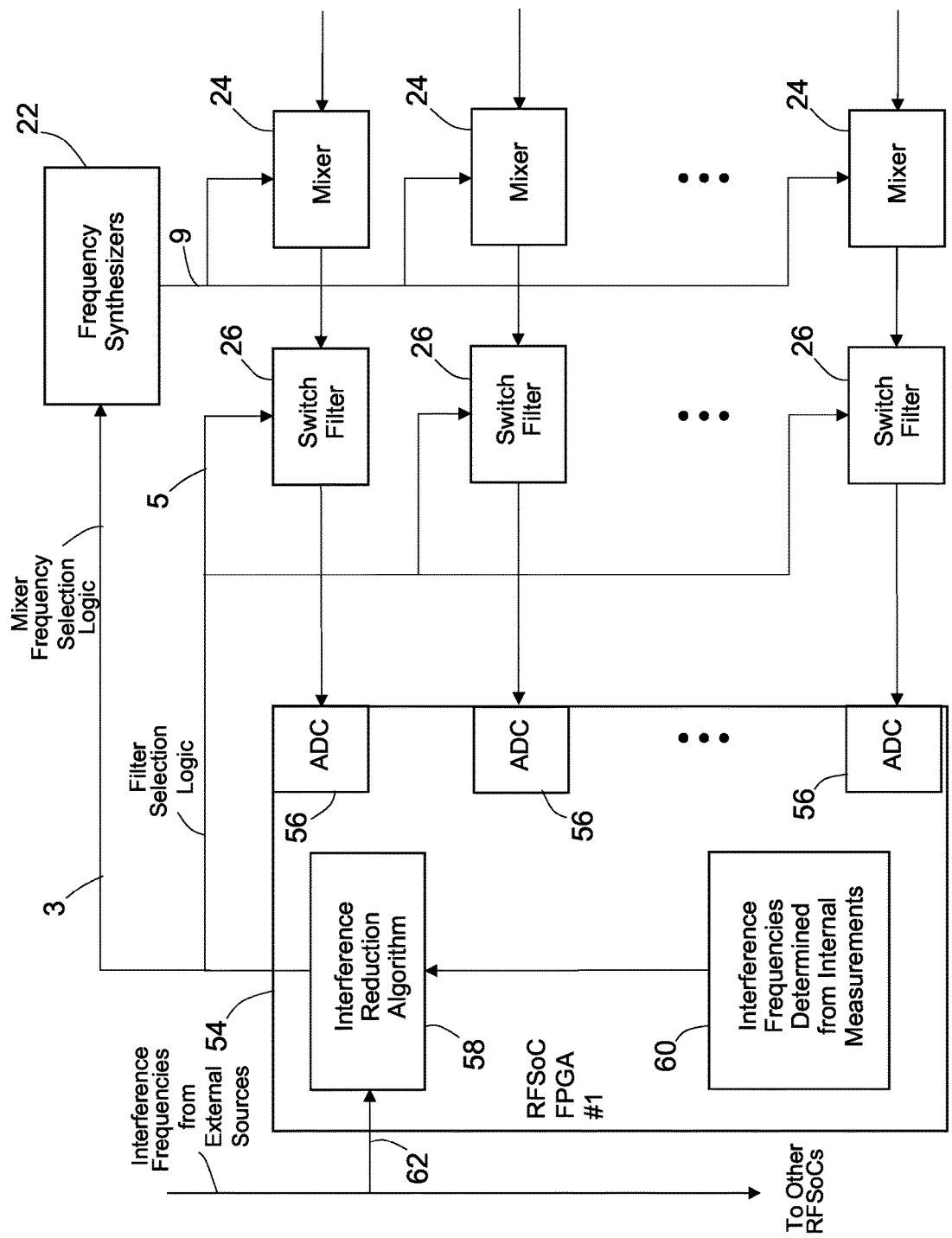
FIG. 4 is a functional block diagram showing control signals generated by a FPGA in accordance with one embodiment.

FIGS. 2A through 2C are diagrams identifying components of respective circuitry blocks of a wideband ADC-based receiver 2 in accordance with one proposed implementation. The signal conditioning block 8 seen in FIG. 2A outputs conditioned signals to the down-converter block 10 depicted in FIG. 2B. The timing and frequency synthesis block 4 seen in FIG. 2C is configured to output master clock signals to the RFSoC block 12 (also depicted in FIG. 2B) and output oscillator signals having selected mixer frequencies to the down-converter block 10 (also depicted in FIG. 2B). The control signals which RFSoC block 12 sends to timing and frequency synthesis block 4 and to down-converter block 10 are not shown in FIGS. 2A-2C, but are shown in FIG. 4 (to be described below).

Referring to FIG. 2A, the antenna block 6 includes an ultrawide-bandwidth antenna 34 that captures all the signals across a wide range of frequencies from $f_{min}$ to $f_{max}$. The signals the ultrawide-bandwidth antenna 34 are received by the signal conditioning block 8, which includes a power limiter 36, a wideband amplifier 38, and a splitter 40 connected in series. The splitter 40 has one input terminal connected to the output terminal of wideband amplifier 38. The power limiter 36 provides circuit protection. After going through the wideband amplifier 38, the amplified signal is split across 8n channels, where n is the number of RFSoCs in the RFSoC block 12 and eight is the number of ADCs per RFSoC (this could be any other number; eight is just an example). Thus, the splitter 40 has 8n output terminals.

The signal conditioning block 8 further includes respective wideband power amplifiers connected to each output terminal of splitter 40. FIG. 2A only shows two wideband power amplifiers 42a and 42b. The wideband power amplifiers provide further protection for large signal voltage swings (although the amplifiers add some noise). The amplified signals then pass through respective variable attenuators to set the signal level correctly for the rest of the signal channel (and ultimately to set the signal level within the ADC's voltage range). FIG. 2A only shows two variable attenuators 44a and 44b respectively connected to the output terminals of wideband power amplifiers 42a and 42b.

FIG. 2B is a block diagram identifying some components of the RFSoC block 12 and down-converter block 10 in accordance with one proposed implementation. The RFSoC block 12 includes n RFSoCs, only two of which are depicted in FIG. 2B, namely a first RFSoC 50a and a last RFSoC 50b. Each RFSoC includes a clock distribution circuit 52, a FPGA 54, and a bank of eight ADCs 56. Each individual ADC 56 may, for example, have a bandwidth of 2 GHz. The down-converter block 10 includes respective signals paths connecting the output terminals of respective variable attenuators of signal conditioning block 8 to the input terminals of respective ADCs 56.

FIGS. 2A and 2B show two example signal paths extending between the splitter 40 of signal conditioning block 8 (FIG. 2A) and the ADCs 56 of the RFSoC block 12 (FIG. 2B). More specifically, the upper signal path connects the first pin of splitter 40 (FIG. 2A) to the input of the first ADC 56 of RFSoC 50a (FIG. 2B), while the lower signal path connects the ninth pin of splitter 40 to the input of the first ADC 56 of RFSoC 50b. In a complete diagram, there would be signal paths to each ADC 56 on each RFSoC.

For avoidance of doubt, the two example signal paths will be described with reference to FIGS. 2A and 2B. The upper signal path includes the following components connected in series: wideband power amplifier 42a and variable attenuator 44a of signal conditioning block 8; and mixer 24a, switch filter 26a, down-conversion mixer 28a, image rejection low-pass (LP) filter 30a, and driver amplifier 32a of down-converter block 10. The output terminal of driver amplifier 32a is electrically connected to an input terminal of the first ADC 56 of RFSoC 50a. Similarly, the lower signal path includes the following components connected in series: wideband amplifier 42b and variable attenuator 44b of signal conditioning block 8; and mixer 24*b*, switch filter 26*b*, down-conversion mixer 28*b*, image rejection LP filter 30*b*, and driver amplifier 32*b* of down-converter block 10. The output terminal of driver amplifier 32*b* is electrically connected to an input terminal of the first ADC 56 of RFSoC 50*b*.

Each signal path in down-converter block 10 includes a fixed-bandwidth switch filter between a respective pair of mixers. In the example depicted in FIG. 2B, switch filter 26*a* is between mixers 24*a* and 28*a*, while switch filter 26*b* is between mixers 24*b* and 28*b*. The switch filter 26*a* receives filter selection logic signals 5 from RFSoC 50*a*, whereas the switch filter 26*b* receives filter selection logic signals 5 from RFSoC 50*b*. The mixers 24*a* and 24*b* receive respective oscillator signals 9 having different mixer frequencies from respective programmable frequency synthesizers 22 of the timing and frequency synthesis block 4 depicted in FIG. 2C. The mixers 28*a* and 28*b* receive local oscillator signals 11 of the same mixer frequency from the local oscillator 18 via a splitter 20 of the timing and frequency synthesis block 4 depicted in FIG. 2C.

FIG. 2C is a block diagram identifying some components of the timing and frequency synthesis block 4 in accordance with one proposed implementation. The timing and frequency synthesis block 4 includes a system reference frequency oscillator 16, an RFSoC clock 14, a phase-locked loop that includes a local oscillator 18, and a plurality of 8*n* programmable frequency synthesizers 22. The system reference frequency oscillator 16 (e.g., a crystal oscillator) generates a common clock signal that is used to synchronize both the RFSoCs and the other frequency generators.

In accordance with one proposed implementation, the RFSoC clock 14 is a phase-locked loop that receives the reference frequency from the system reference frequency oscillator 16 and outputs clock signals to the RFSoC block 12. Each programmable frequency synthesizer 22 is a phase-locked loop having a programmable divider (e.g., a programmable digital counter) in the feedback loop. The programmable divider may be programmed so that the phase-locked loop receives the reference frequency and outputs an oscillating signal having a selected mixer frequency. The local oscillator 18 is part of a phase-locked loop configured to receive the reference frequency and generate an oscillating signal having a selected mixer frequency. The timing and frequency synthesis block 4 further includes a splitter 20 that outputs 8*n* replicas of the oscillating signal output by local oscillator 18, one such oscillating signal for each signal path (channel) in the down-converter block 10.

Figure 3:
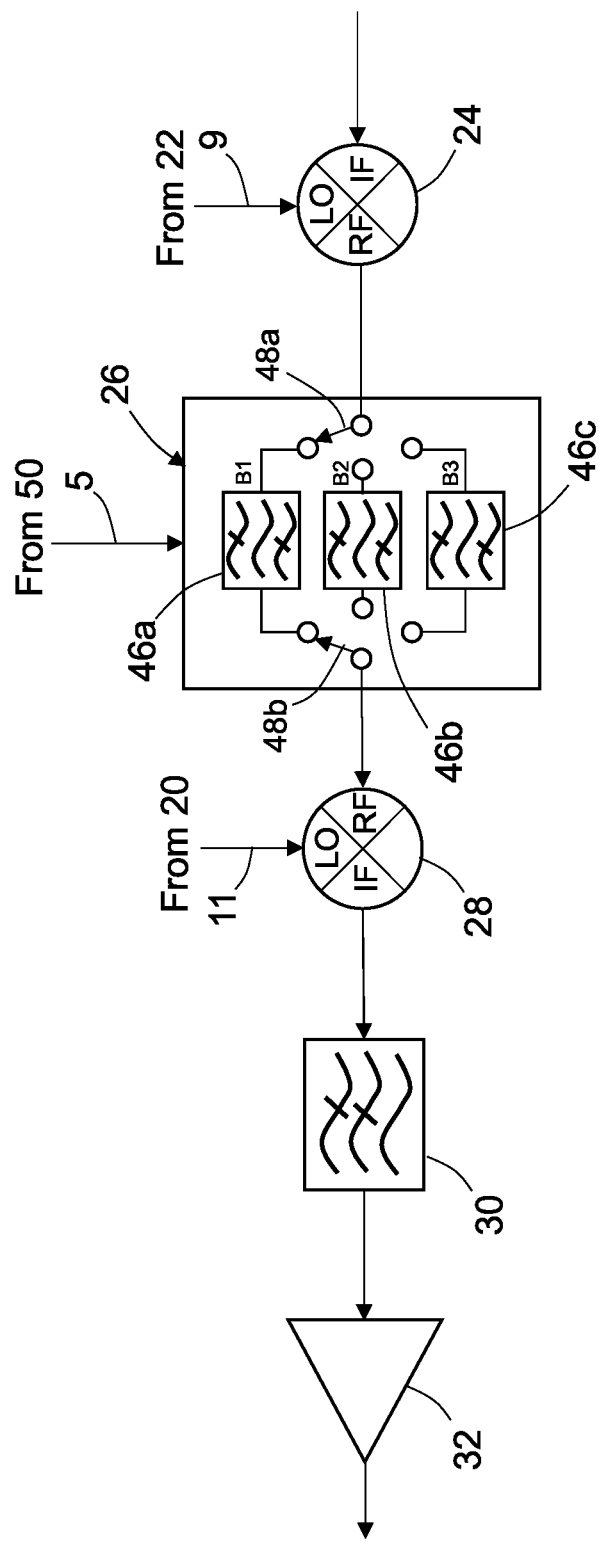
FIG. 3 is a diagram showing circuitry for each channel of the down-converter block depicted in FIG. 2B in accordance with one embodiment.

FIG. 3 is a diagram showing circuitry for each channel of the down-converter block 10 depicted in FIG. 2B in accordance with one embodiment. In this embodiment, the switch filter 26 includes a first fixed-bandwidth bandpass filter 46*a* having a bandwidth B1, a second fixed-bandwidth bandpass filter 46*b* having a bandwidth B2, and a third fixed-bandwidth bandpass filter 46*c* having a bandwidth B3. Each switch filter 26 further includes a pair of switches 48*a* and 48*b* (hereinafter "first switch 48*a*" and "second switch 48*b*"), each having three switch positions. When first and second switches 48*a* and 48*b* are in the positions depicted in FIG. 3, the signal path connecting the output terminal of mixer 24 to the input terminal of down-conversion mixer 28 goes through first fixed-bandwidth bandpass filter 46*a*. The switch positions are controlled by the filter selection logic signals 5 received from the RFSoC 50.

Still referring to FIG. 3, the mixer 24 multiplies the intermediate frequency (IF) signal from the signal conditioning block 8 and the oscillator signal 9 from a programmable frequency synthesizer 22. The oscillator signal 9 has a tunable mixing frequency generated from a programmable frequency synthesizer 22 that moves the signal up in frequency to be within the bandwidth of the selected fixed-bandwidth bandpass filter of switch filter 26. The output is a radio frequency (RF) signal which is bandpass filtered by the selected fixed-bandwidth bandpass filter. The filtered RF signal is output to a down-conversion mixer 28, which multiplies the bandpass-filtered RF signal and the local oscillator signal 11 from the splitter 20.

The IF signal output by down-conversion mixer 28 is then filtered by an image rejection LP filter 30. The low-pass-filtered IF signal is then amplified by a driver amplifier 32. That amplified signal is input to the ADC 56 to which the output terminal of driver amplifier 32 is connected.

In accordance with the improvement proposed herein, the frequency of the signal output by mixer 24 and the bandwidth of switch filter 26 are both selected by the associated RFSoC 50 in dependence in part on the frequency of detected interference signals. Although in the example depicted in FIG. 3, the switch filter 26 includes three fixed-bandwidth bandpass filters, the switch filter 26 may include two or more fixed-bandwidth bandpass filters, only one of which is selected to bandpass filter the tuned signal received from mixer 24, thereby allowing the output of the switch filter 26 to be lowered to within the bandwidth of the ADC 56.

In accordance with the embodiment depicted in FIG. 3, the switch filter 26 includes a first switch 48*a* connected to the mixer 24. The first switch 48*a* is configured to change from a first state to a second state in response to receipt of a first filter selection logic signal by the switch filter 26. The first switch 48*a* is further configured to change from a first state to a third state in response to receipt of a second filter selection logic signal by the switch filter 26. The switch filter 26 also includes a second switch 48*b* connected to the down-conversion mixer 28. The second switch 48*b* is configured to change from a first state to a second state in response to receipt of the first filter selection logic signal by the switch filter 26. The second switch 48*b* is further configured to change from a first state to a third state in response to receipt of the second filter selection logic signal by the switch filter 26. In addition, the switch filter 26 includes a first bandpass filter 46*a* having a first bandwidth, a second bandpass filter 46*b* having a second bandwidth, and a third bandpass filter 46*c* having a third bandwidth. The first bandpass filter 46*a* connects the second switch 48*b* to the first switch 48*a* when the first and second switches 48*a* and 28*b* are in the first states. The second bandpass filter 46*b* connects the second switch 48*b* to the first switch 48*a* when the first and second switches are in the second states. The third bandpass filter 46*c* connects the second switch 48*b* to the first switch 48*a* when the first and second switches 48*a* and 48*b* are in the third states.

After passing through the selected filter (controlled by the RFSoC 50), the signal is then moved down in frequency to fit within the ADCs bandwidth and the mixed image is rejected by the image rejection LP filter 30, followed by a driver amplifier 32 to set the signal's level to within the ADC's voltage range. Note that the down-conversion mixer 28 is always at the same frequency because the design adopted herein succeeds in reducing the number of frequency synthesizers to a total of only 1+8n.

FIG. 4 is a functional block diagram showing control signals generated by a FPGA 54 in accordance with one embodiment. In order to form the correct control signals, an interference reduction algorithm 58 is computed by the FPGA 54. In alternative embodiments, the interference reduction algorithm 58 may be executed on an external processor. The algorithm requires receiving input concerning the set of interfering signal frequencies. These could be either a center frequency for a narrow-band signal or a frequency and bandwidth for wider-band signals. Interference frequencies 62 may come from external sources or interference frequencies 60 may be estimated internal to the FPGA 54. For example, an entirely separate RF subsystem could produce this information and send it to each RFSoC 50. Or each RFSoC 50 could command a frequency search over the signals coming into its ADCs 56 in order to derive the frequencies of the interfering signals.

Still referring to FIG. 4. the output of the interference reduction algorithm 58 is filter selection logic signals 5 representing a set of filter selections and mixer frequency selection logic signals 3 representing mixer frequencies to allocate front-end resources for the eight signal channels feeding into each RFSoC. The filter selection logic signals 5 program the switch filters 26. The mixer frequency selection logic signals 3 program the programmable frequency synthesizers 22, which supply oscillator signals having the selected mixer frequencies to the mixers 24 of the down-converter block 10. The interference reduction algorithm 58 is configured to take the locations of the interfering signals in the frequency spectrum and program the switch filters 26 of the down-converter block 10 and program the programmable frequency synthesizers 22 to best cover the designed receiver frequency range.

Given a set of interfering signals at given frequencies $\{f_i\}$, one may produce both filter selections $\{BW_i\}$ and mixer frequencies $\{M_i\}$. Since the mixer frequencies are simply related to the desired center frequencies of the chosen filters, this disclosure instead describes producing center frequencies $\{F_i\}$. The two keys to the approach are: (1) identification of the difference vector $\{\Delta f_i = f_{i+1} - f_i\}$ of interferers with bins and transforming the problem into a type of bin packing problem; and (2) small modifications to a heuristic bin packing algorithm appropriate to our interference mitigation problem. This is described below after briefly covering the generic bin packing problem and its approximate solution.

The classic Bin Packing Problem (BPP) is described as follows. Given n items and n bins, wherein $w_j$ is the weight of item j and c is the capacity of each bin, the BPP is to assign each item to one bin so that the total weight of the items in each bin does not exceed c and the number of bins used is a minimum. This problem can be formulated as a formal optimization problem as follows:

$$\text{Minimize } z = \sum_{i=1}^{n} y_i$$

subject to $$\sum_{j=1}^{n} w_j x_{ij} \leq c y_i, \, i = 1, 2, \ldots, n,$$

$$y_i = \begin{cases} 1 & \text{bin } i \text{ is used} \\ 0 & \text{otherwise} \end{cases}$$

$$x_{ij} = \begin{cases} 1 & j \text{ assigned to bin } i \\ 0 & \text{otherwise} \end{cases}$$

where the weights $w_j$ are positive values and $w_j \leq c$.

Here are brief descriptions of the six common heuristic algorithms for bin packing:

Next-Fit: The first item is assigned to the first bin. The second item is assigned to the current bin if it fits; otherwise, it is assigned to a new bin which becomes the current bin. This process continues through all the items.

First-Fit: Each item is assigned to the lowest indexed initialized bin into which it fits; otherwise a new bin is initialized.

Best-Fit: This is a modification of First-Fit and assigns the current item to an initialized bin (if any) that has the smallest residual capacity, where ties are broken in favor of the lowest indexed bin.

Next-Fit-Decreasing: Next-fit using a re-indexed list of items sorted by weight of the items.

First-Fit-Decreasing: First-fit using a re-indexed list of items sorted by weight of the items.

Best-Fit-Decreasing: Best-fit using a re-indexed list of items sorted by weight of the items.

Note that, for a minimization problem such as bin packing, the asymptotic worst-case performance ratio of an approximate (heuristic) algorithm A is defined as the smallest real number $r^\infty(A)$ such that $A(I)/Z(I) \leq r^\infty(A)$ for all problem instances I satisfying $Z(I) \geq k$ for some positive integer k, where Z(I) denotes the optimal solution for I and A(I) denotes the solution value provided by A.

TABLE 1

| Algorithm | Serial Computing Complexity | $r^\infty$ |
|---|---|---|
| Next Fit (NF) | O(n) | 2 |
| First Fit (FF) | O(n log(n)) | 1.7 |
| Best Fit (BF) | O(n log(n)) | 1.7 |
| Next Fit Decreasing (NFD) | O(n log(n)) | 1.691 |
| First Fit Decreasing (FFD) | O(n log(n)) | 1.222 |
| Best Fit Decreasing (BFD) | O(n log(n)) | 1.222 |

Table 1 shows various heuristic algorithms with their complexity and asymptotic worst case performance. More information can be found in Martello, Silvano; Toth, Paolo, "Bin-packing problem", Chapter 8, Knapsack Problems: Algorithms and Computer Implementations, Chichester, UK: John Wiley and Sons, 1990. The following discussion assumes using a modified version of BFD.

Given a sorted list of N normalized interference frequencies between 0 and 1, the list of N+1 frequency differences $\{\Delta f_i\}$ is the starting point of the interference reduction algorithm 58. Most methods naturally produce this list already sorted, so interference reduction algorithm 58 ends up being O(N) in complexity. The steps are as follows:

Loop i through the N+1 bins $\{\Delta f_i\}$
    Loop through the filter bandwidths $\{BW_j\}$, where j varies over the number of filter levels.
    For j=1, compute $$A_1 = \left\lfloor \frac{\Delta f_i}{BW_1} \right\rfloor$$

This gives the number of full bandwidth ($BW_1$) filters to allocate to this frequency range ($f_1, f_2$). Then update $\Delta f_i = \max \Delta f_i - A_1 BW_1, 0$ and compute $$A_2 = \left\lfloor \frac{\Delta f_i}{BW_2} \right\rfloor$$

This gives the number of narrower bandwidth ($BW_2$) filters (either 0 or 1) to allocate to this frequency range ($f_1$, $f_2$). Continue updating $\Delta f_i = \max \Delta f_i - A_1 BW_1$, 0 etc.

Continue until done with all the filter bandwidths.

Continue looping through the rest of the N+1 bins $\{\Delta f_i\}$.

Figure 5:
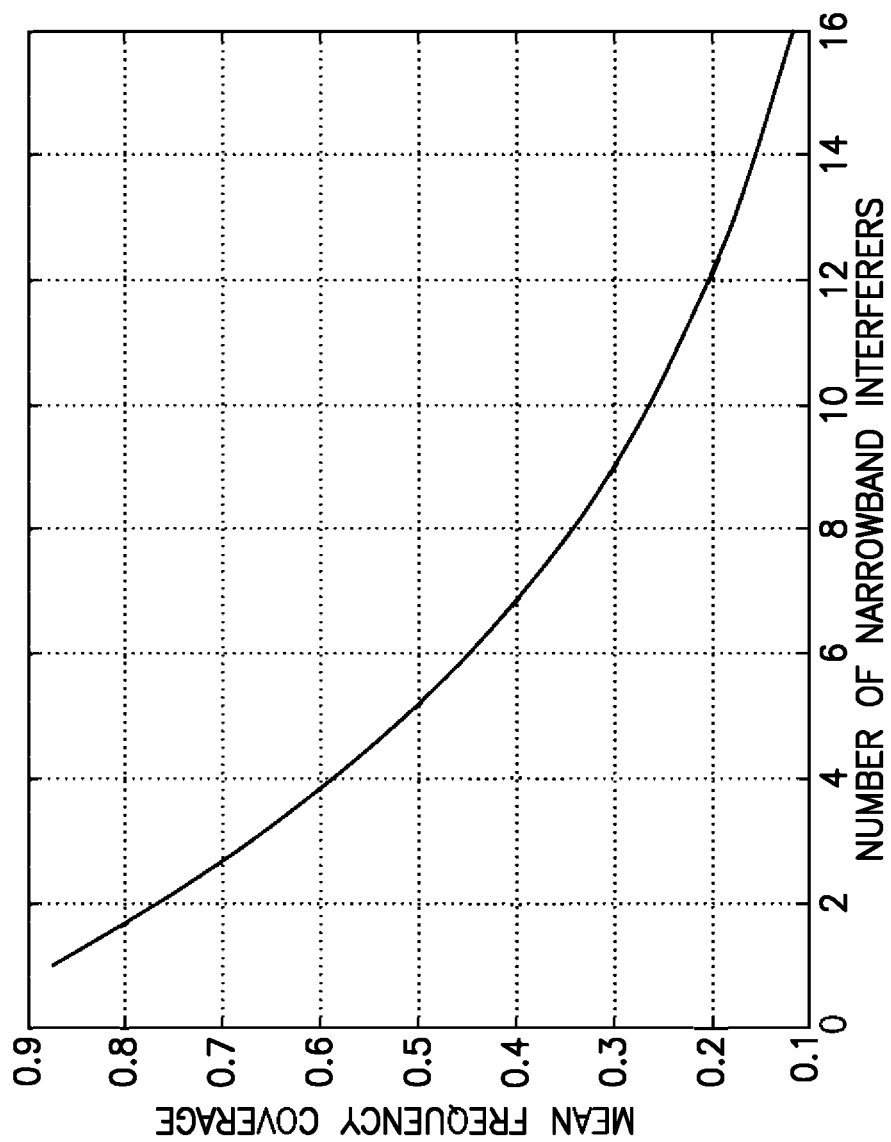
FIG. 5 is a graph showing interference effects on frequency coverage without mitigation in accordance with a first simulation assuming eight ADCs.

A simulation of the above-described interference reduction algorithm was developed and was able to show a remarkable improvement of frequency coverage. First, start with the effects when no interference mitigation is attempted. FIG. 5 shows the effect of interferers on frequency coverage. Here the simulation used eight ADCs that cover an 8× frequency range. For example, if each ADC is capable of converting 4 giga-samples per second (Gsps), each ADC can support 2 GHz of bandwidth and so the overall frequency range is 16 (=8*2) GHz. Frequency coverage is given as a fraction of this total frequency range. As can be seen in FIG. 5, interference causes a drastic drop in mean frequency coverage as a function of number of interferers because the dynamic range effects disable usage of more and more ADCs.

Figure 6:
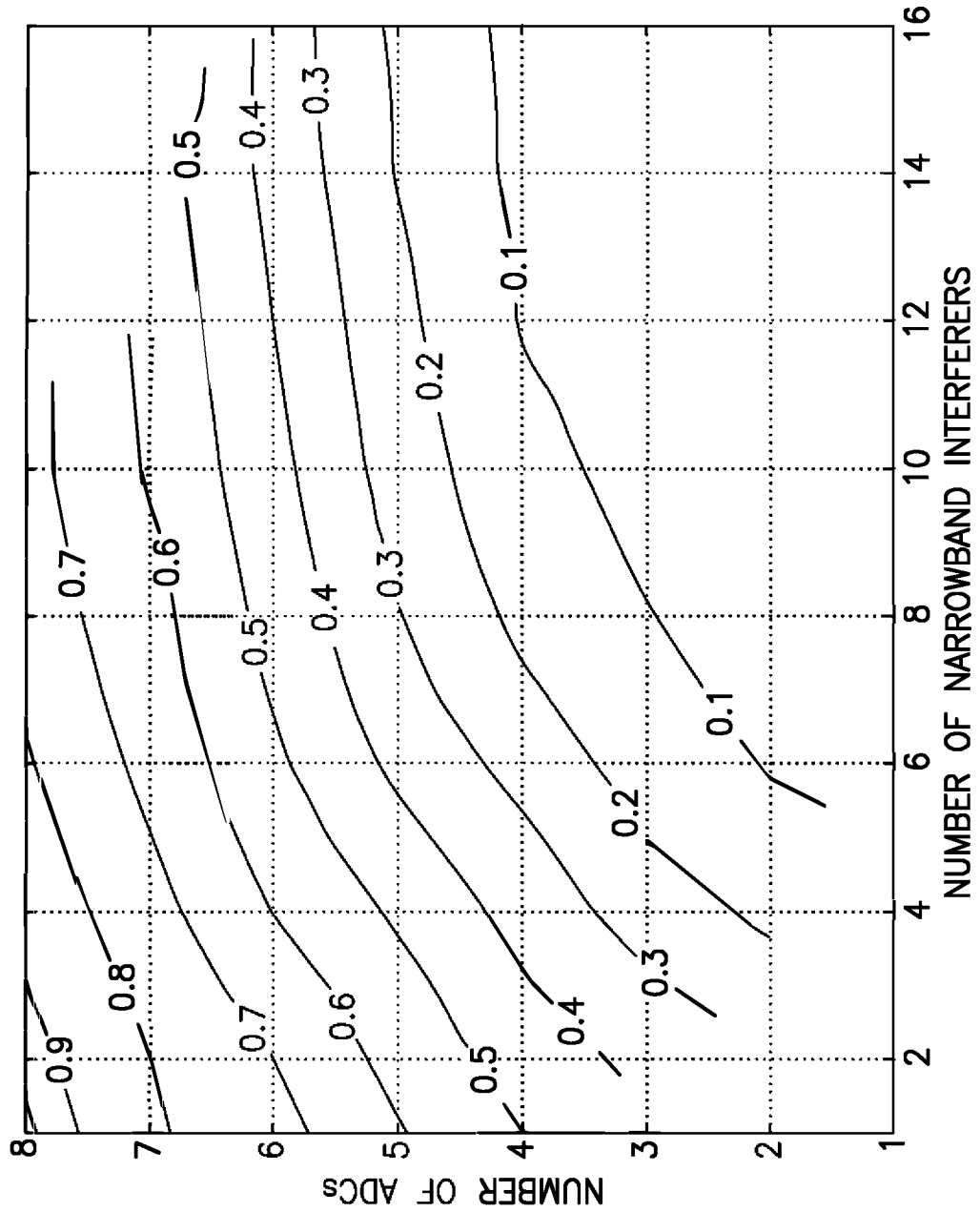
FIG. 6 is a graph showing the mean bandwidth coverage interference performance for an 8-ADC frequency range in accordance with a second simulation in which each signal channel has one filter (hereinafter "one filter level").
Figure 7:
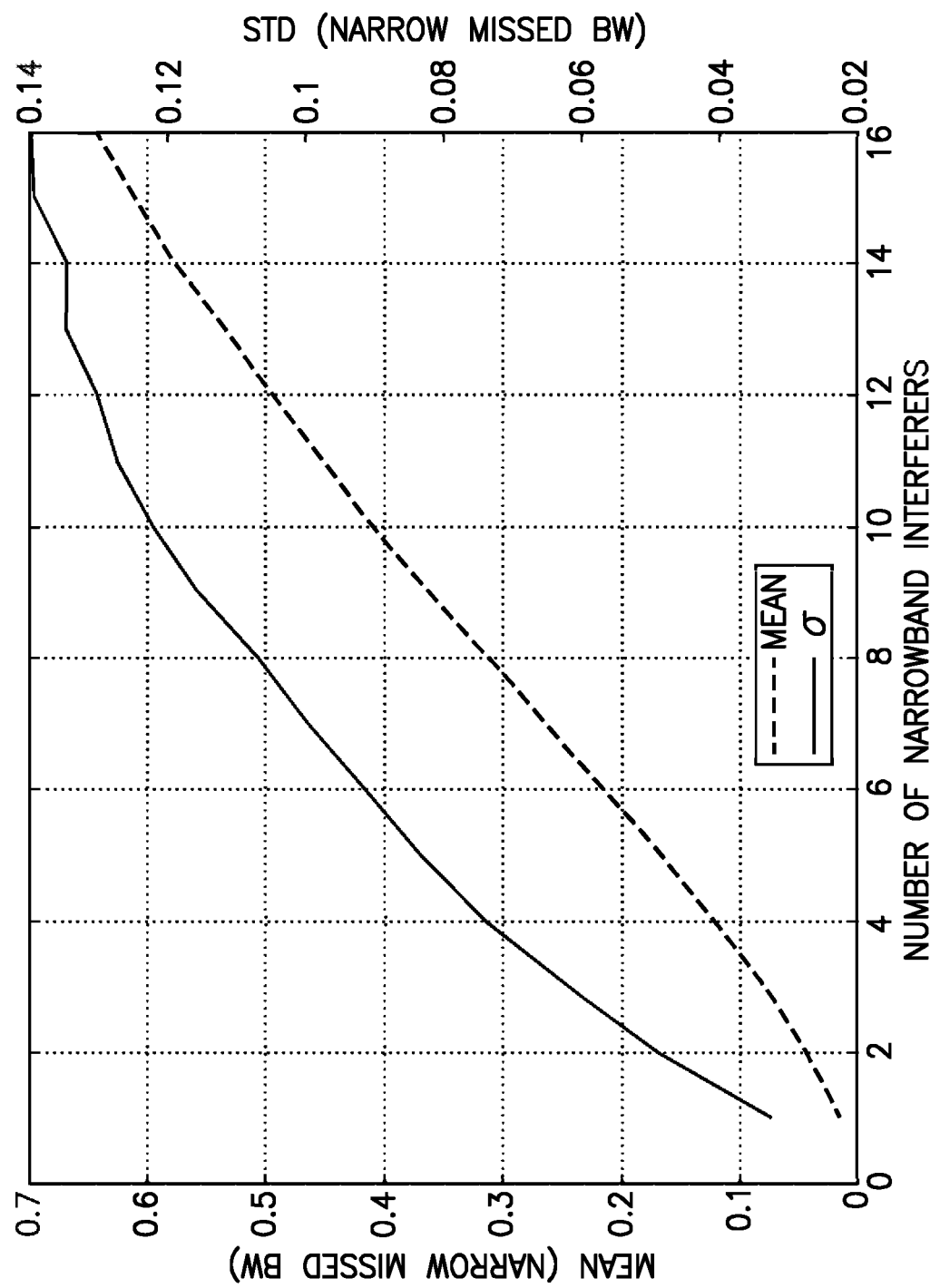
FIG. 7 is a graph showing the mean and standard missed narrow-bandwidth coverage interference performance for the second simulation in which the RF front end has an 8-ADC frequency range and one filter level.
Figure 8:
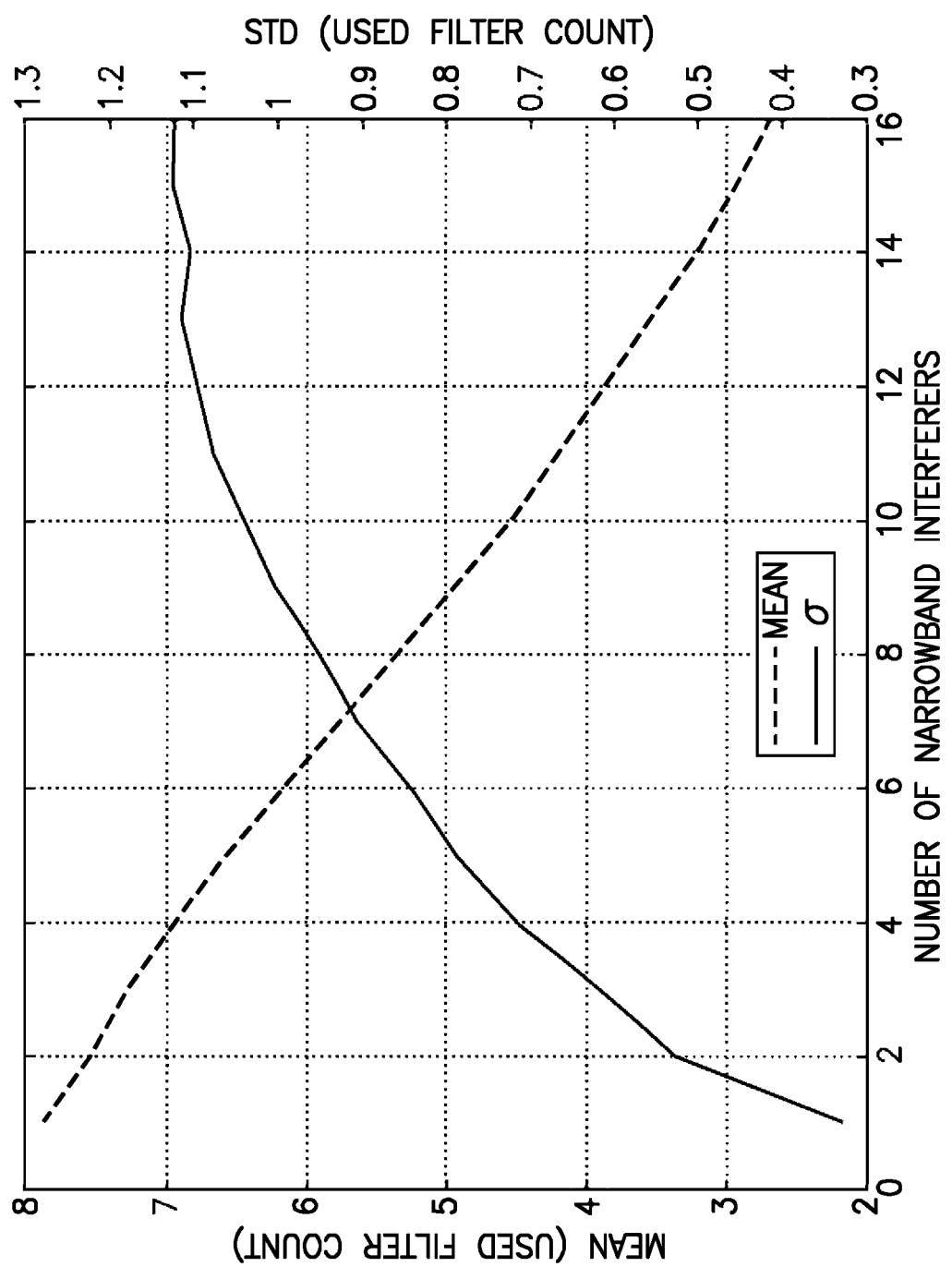
FIG. 8 is a graph showing the mean and standard used filter count performance for the second simulation in which the RF front end has an 8-ADC frequency range and one filter level.

The graph in FIG. 6 shows the effects of having one filter per signal channel (with bandwidth matched to an ADC), but with the ability to move each fixed bandwidth filter around in frequency. Clearly the coverage has gone up remarkably. For example, with twelve interferers, the frequency coverage without mitigation is 0.2, while with this simple mitigation, the coverage has gone up to 0.5. FIG. 7 shows the mean coverage missed because narrow-band sections (between two interferers) are closer than one ADC bandwidth apart and hence cannot be covered. FIG. 8 shows how many total filters are used as a function of the number of interferers, clearly demonstrating that while a one filter per signal channel (called one level) does help a great deal, fewer and fewer ADC/filter combinations are used as the channels drop off from coverage as the number of interferers increases.

Figure 9:
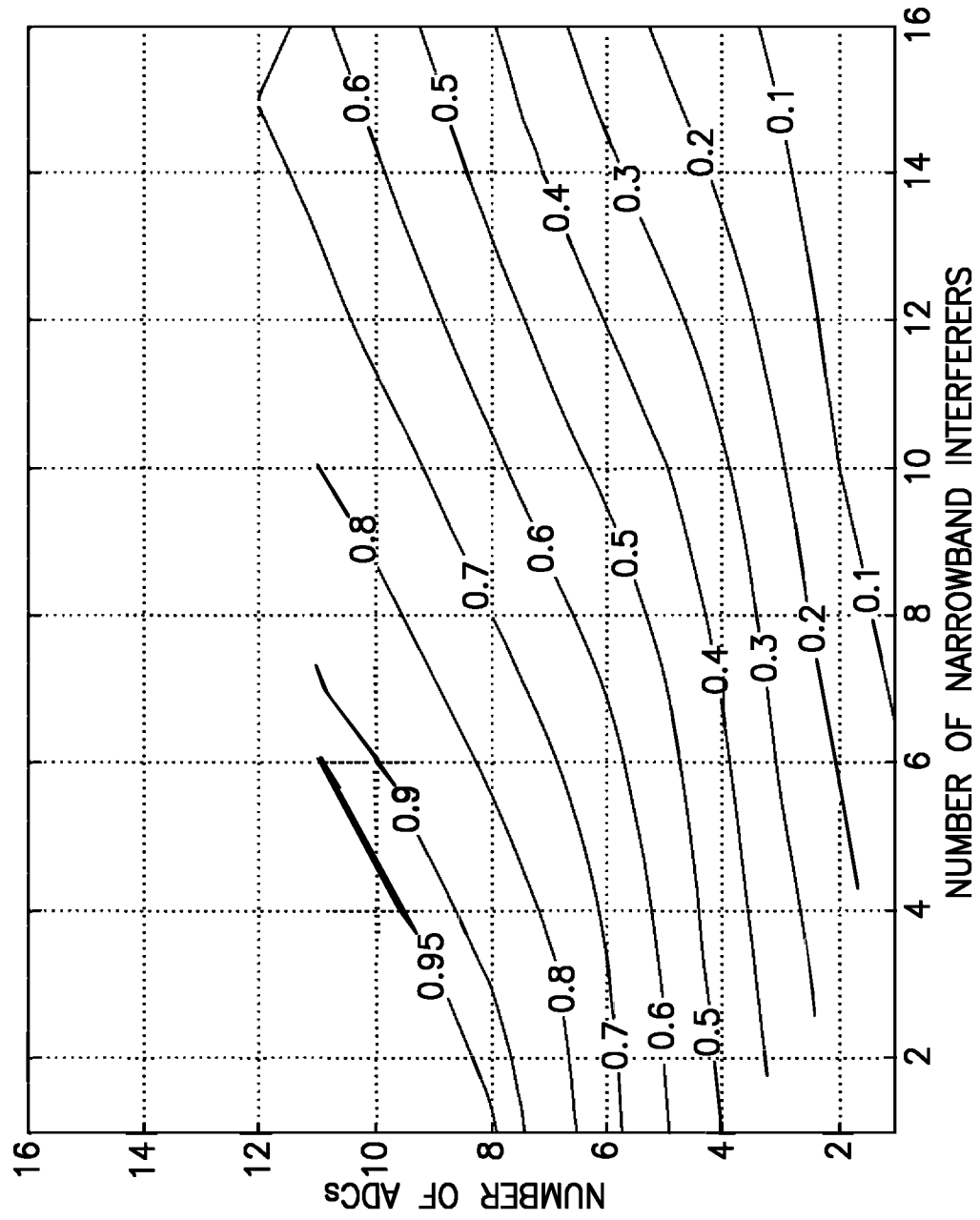
FIG. 9 is a graph showing the mean bandwidth coverage interference performance for an 8-ADC frequency range in accordance with a third simulation in which each signal channel has two filters (hereinafter "two filter levels").
Figure 10:
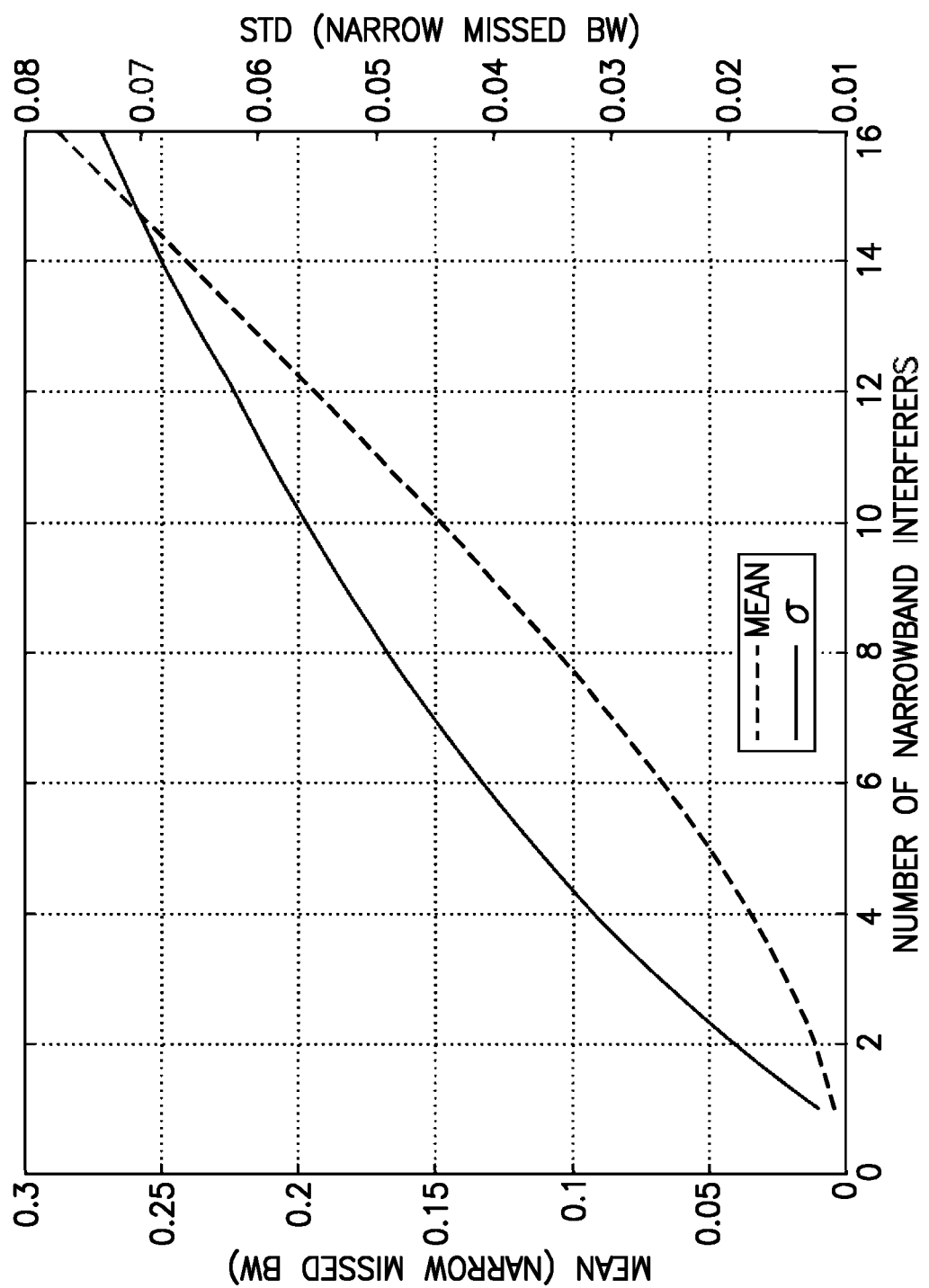
FIG. 10 is a graph showing the mean and standard missed narrow-bandwidth coverage interference performance for the third simulation in which the RF front end has an 8-ADC frequency range and two filter levels.
Figure 11:
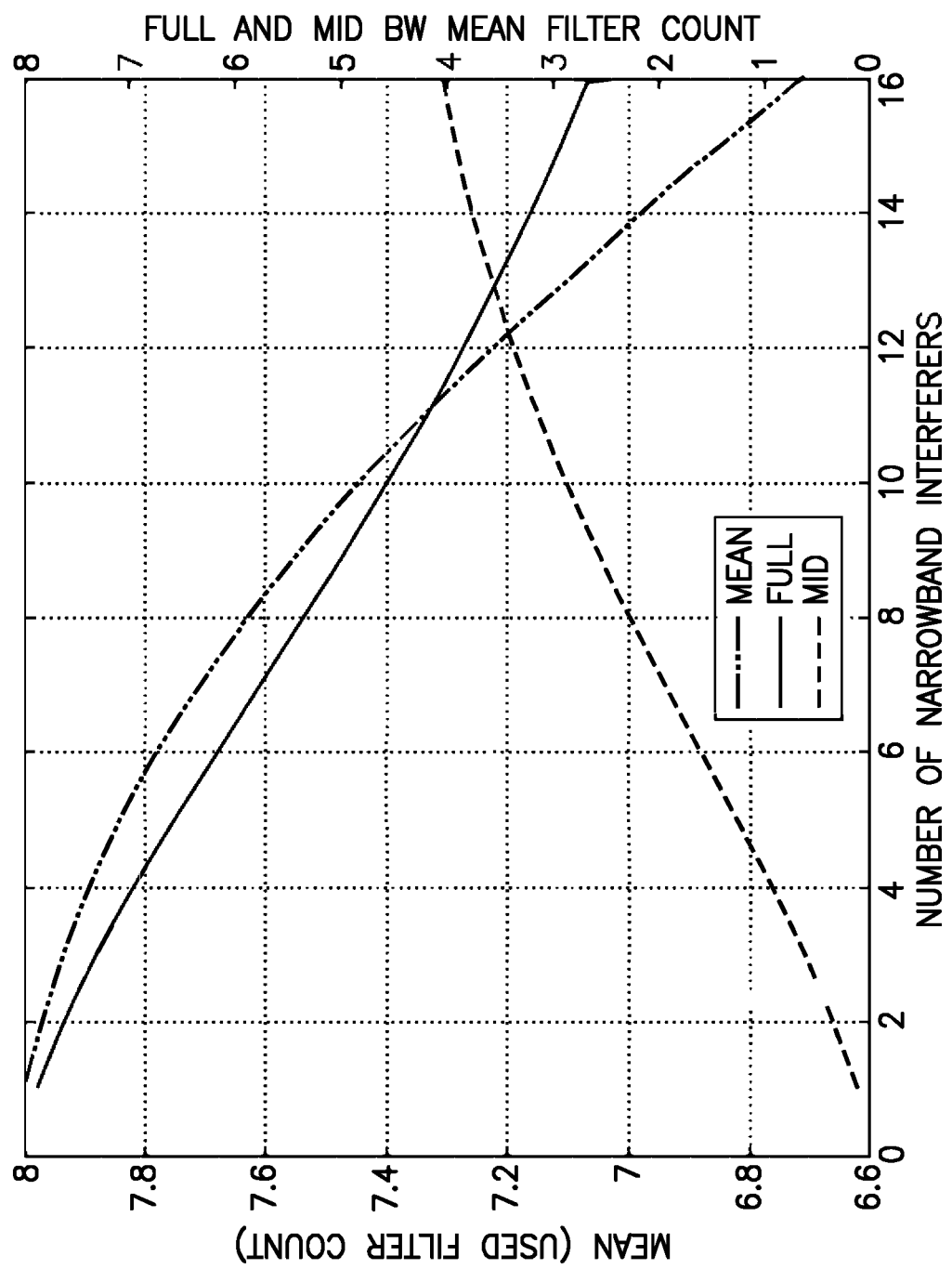
FIG. 11 is a graph showing the mean and standard used filter count performance for the third simulation in which the RF front end has an 8-ADC frequency range and two filter levels.

The next set of three graphs (FIGS. 9-11) show the improvements when two filters are used per channel (one with the ADC bandwidth called Full and one with half its bandwidth called Mid). FIG. 9 shows the effects of having two filters per signal channel with the ability to select the best bandwidth and to move each fixed bandwidth filter around in frequency. Clearly the coverage has gone up even further, although it does not fully utilize the sixteen ADCs from two RFSoCs. FIG. 10 shows the mean coverage missed because narrow-band sections (between two interferers) are closer than one-half ADC bandwidth apart and hence cannot be covered. FIG. 11 shows how many total filters are used as a function of the number of interferers and shows (on the right-hand side of the graph) how many filters are used of each type (Full and Mid).

Figure 12:
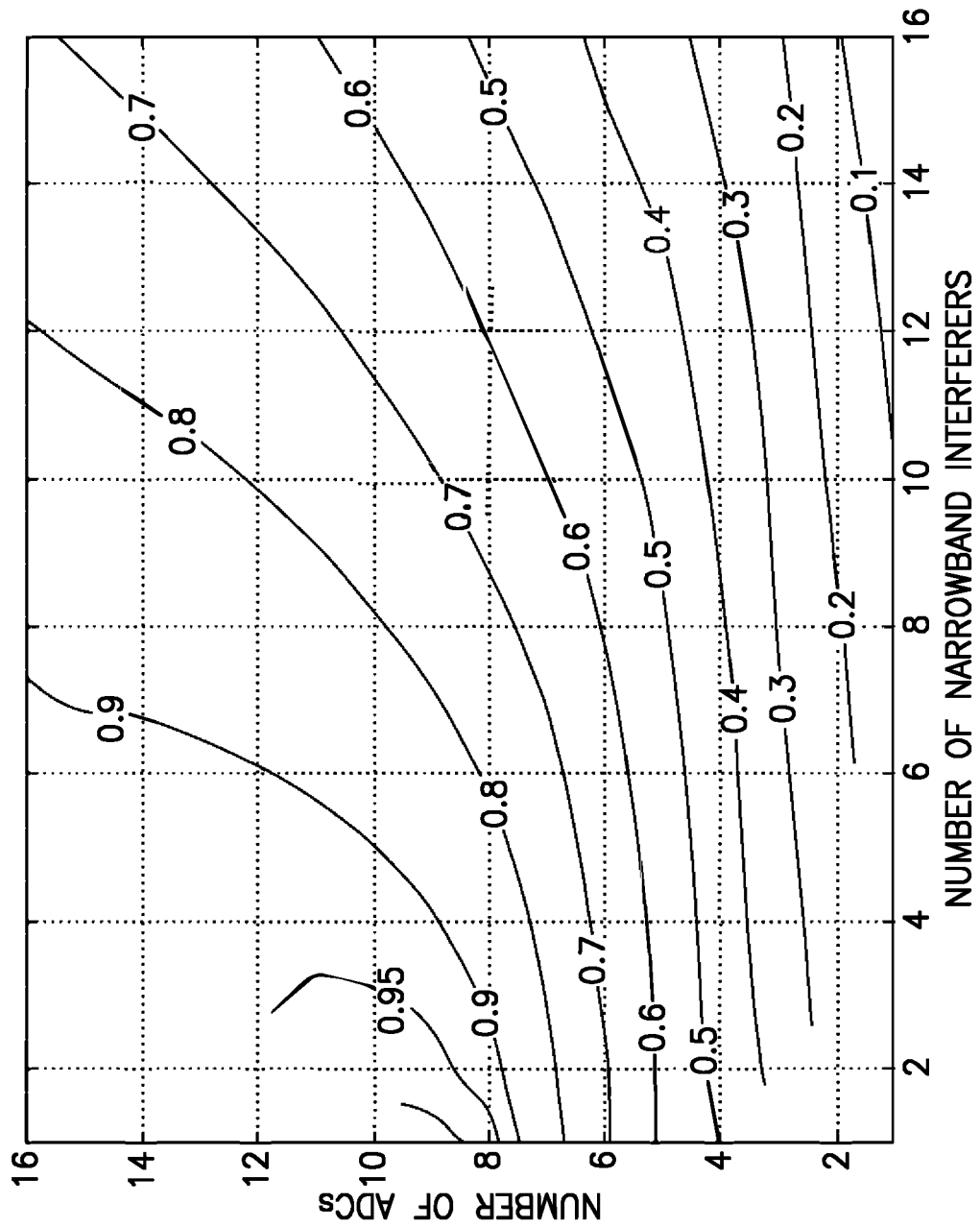
FIG. 12 is a graph showing the mean bandwidth coverage interference performance for an 8-ADC frequency range in accordance with a fourth simulation in which each signal channel has three filters (hereinafter "three filter levels").
Figure 13:
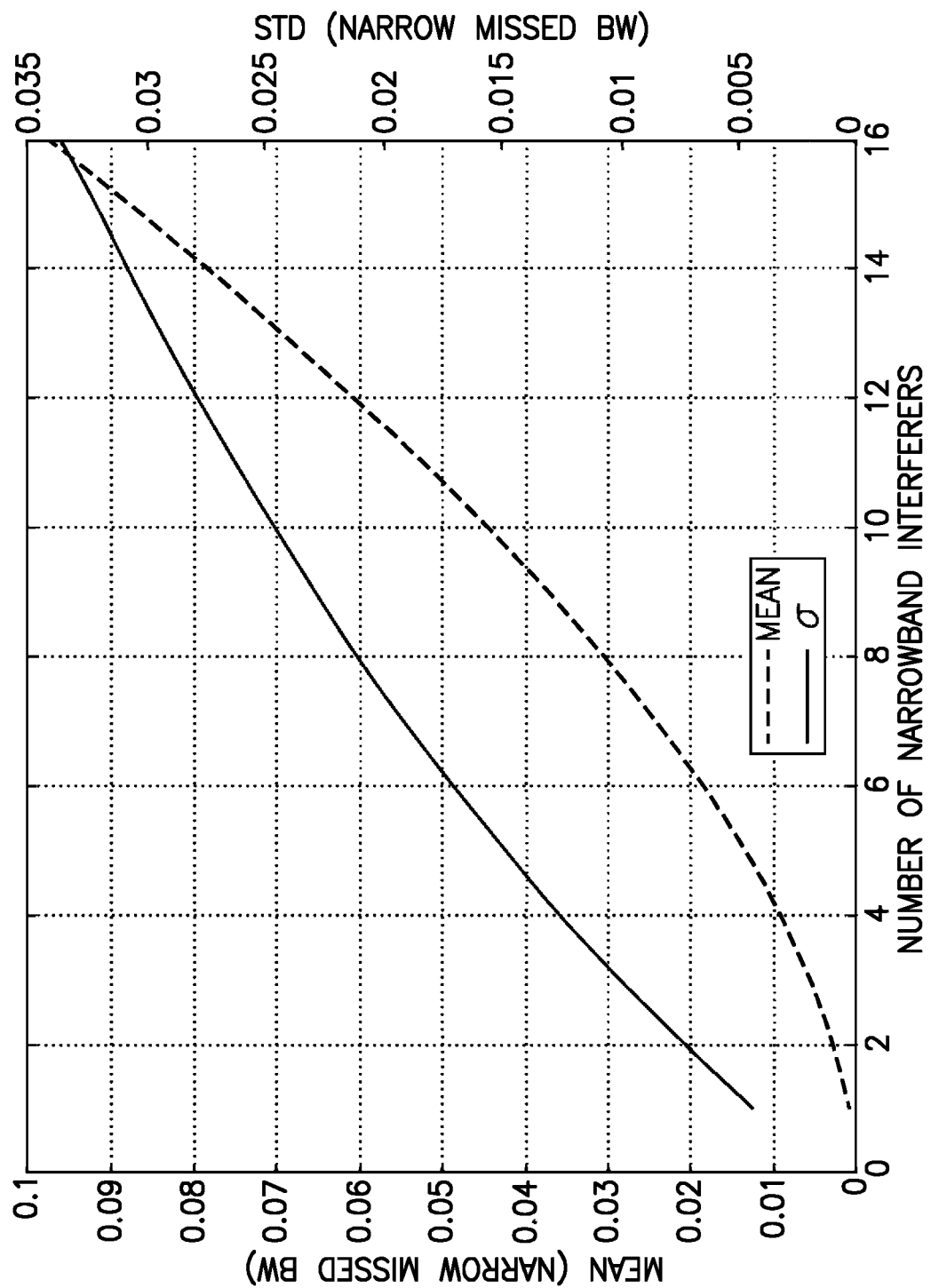
FIG. 13 is a graph showing the mean and standard missed narrow-bandwidth coverage interference performance for the fourth simulation in which the RF front end has an 8-ADC frequency range and three filter levels.
Figure 14:
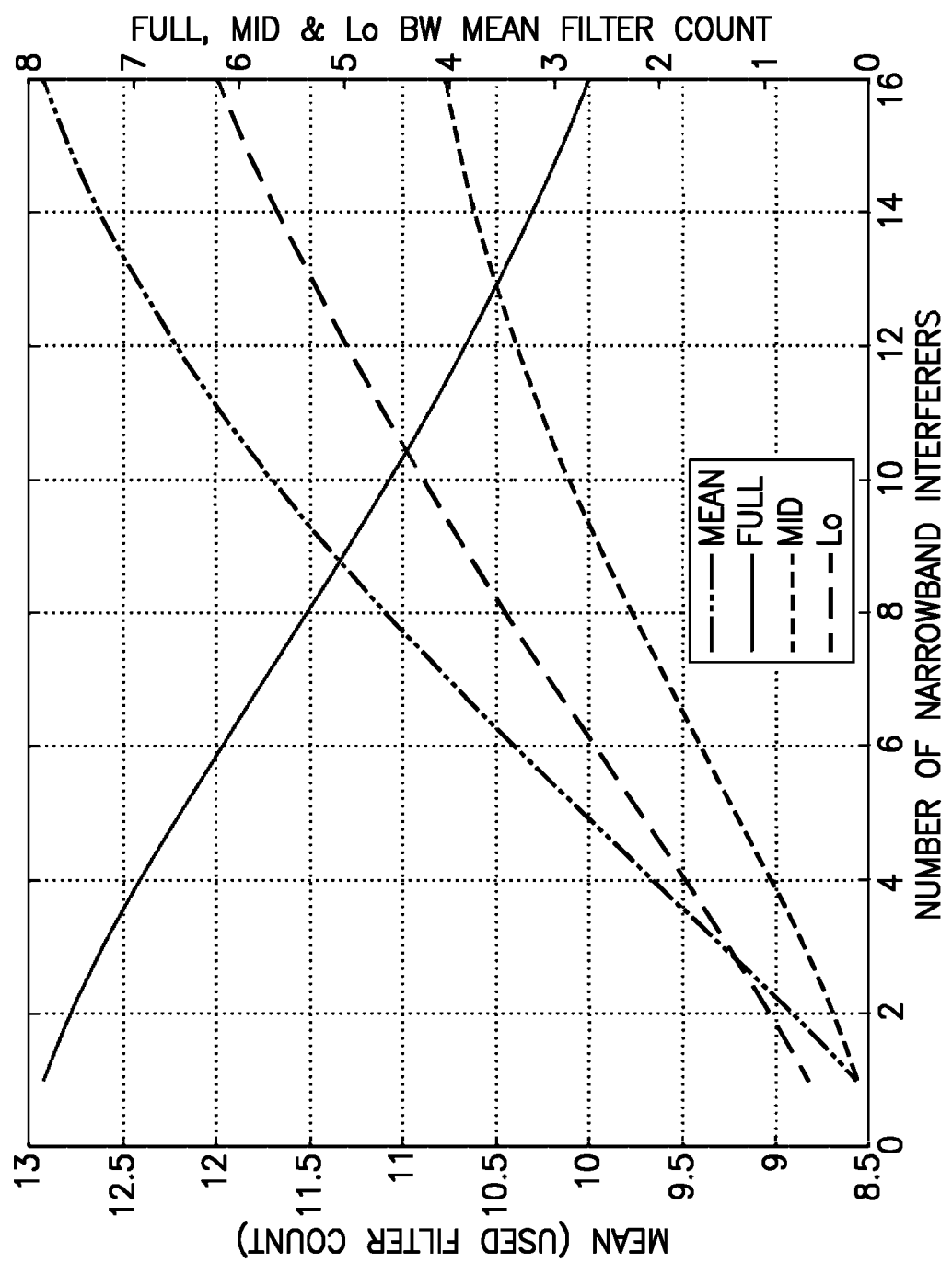
FIG. 14 is a graph showing the mean and standard used filter count performance for the fourth simulation in which the RF front end has an 8-ADC frequency range and three filter levels.

The next set of three graphs (FIGS. 12-14) show the further improvements when three filters are used per channel (called Full, Mid, and Lo). FIG. 12 shows the effects of having three filters per signal channel with the ability to select the best bandwidth and to move each fixed bandwidth filter around in frequency. Clearly the coverage has gone up even further, and the sixteen ADCs are being more fully utilized from two RFSoCs. FIG. 13 shows the mean coverage missed because narrow-band sections (between two interferers) are closer than one-quarter ADC bandwidth apart and hence cannot be covered. FIG. 14 shows how many total filters are used as a function of the number of interferers and shows (on the right-hand side of the graph) how many filters are used of each type (Full, Mid, and Lo).

Figure 15:
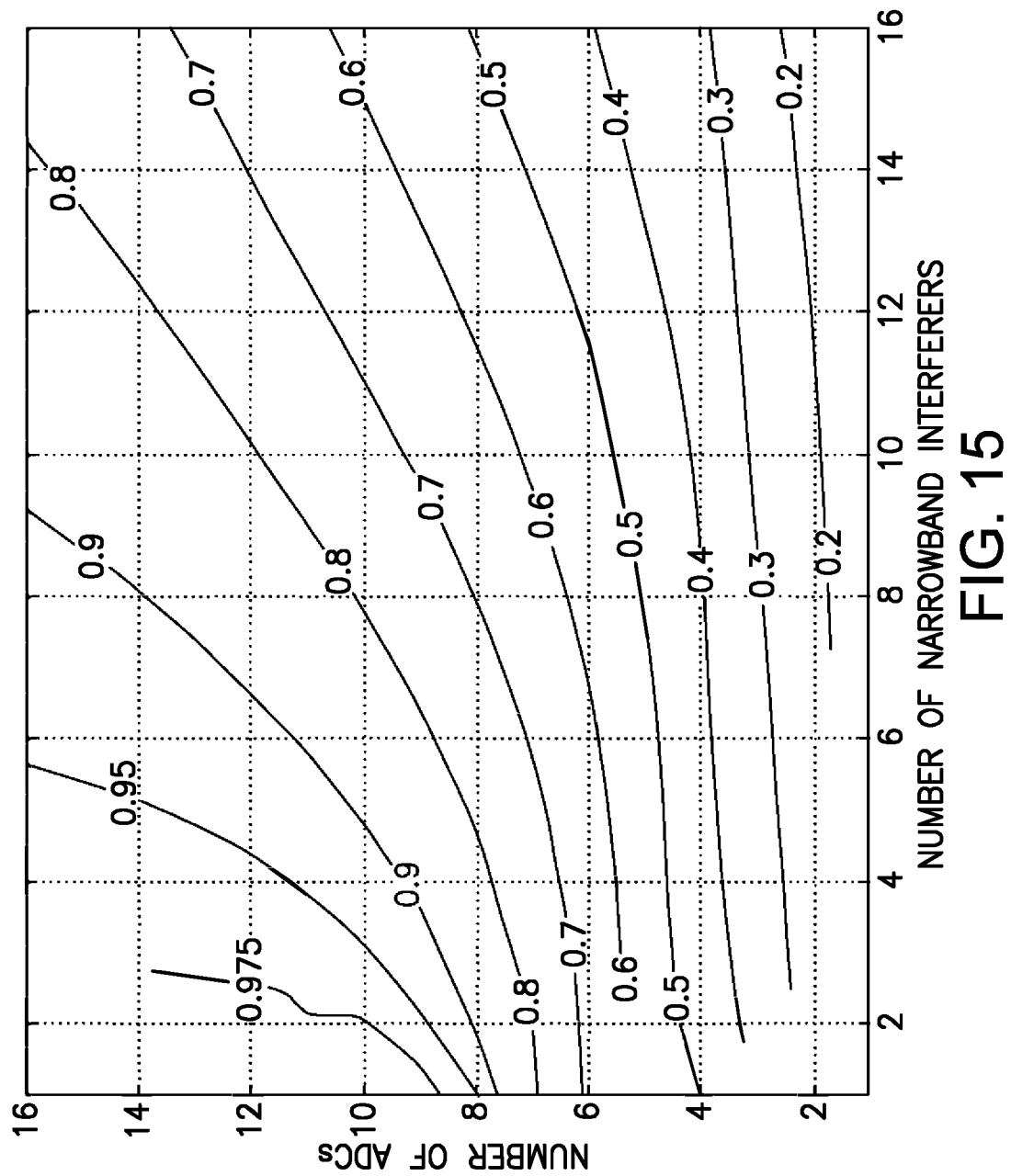
FIG. 15 is a graph showing the mean bandwidth coverage interference performance for an 8-ADC frequency range in accordance with a fifth simulation in which each signal channel has four filters (hereinafter "four filter levels").
Figure 16:
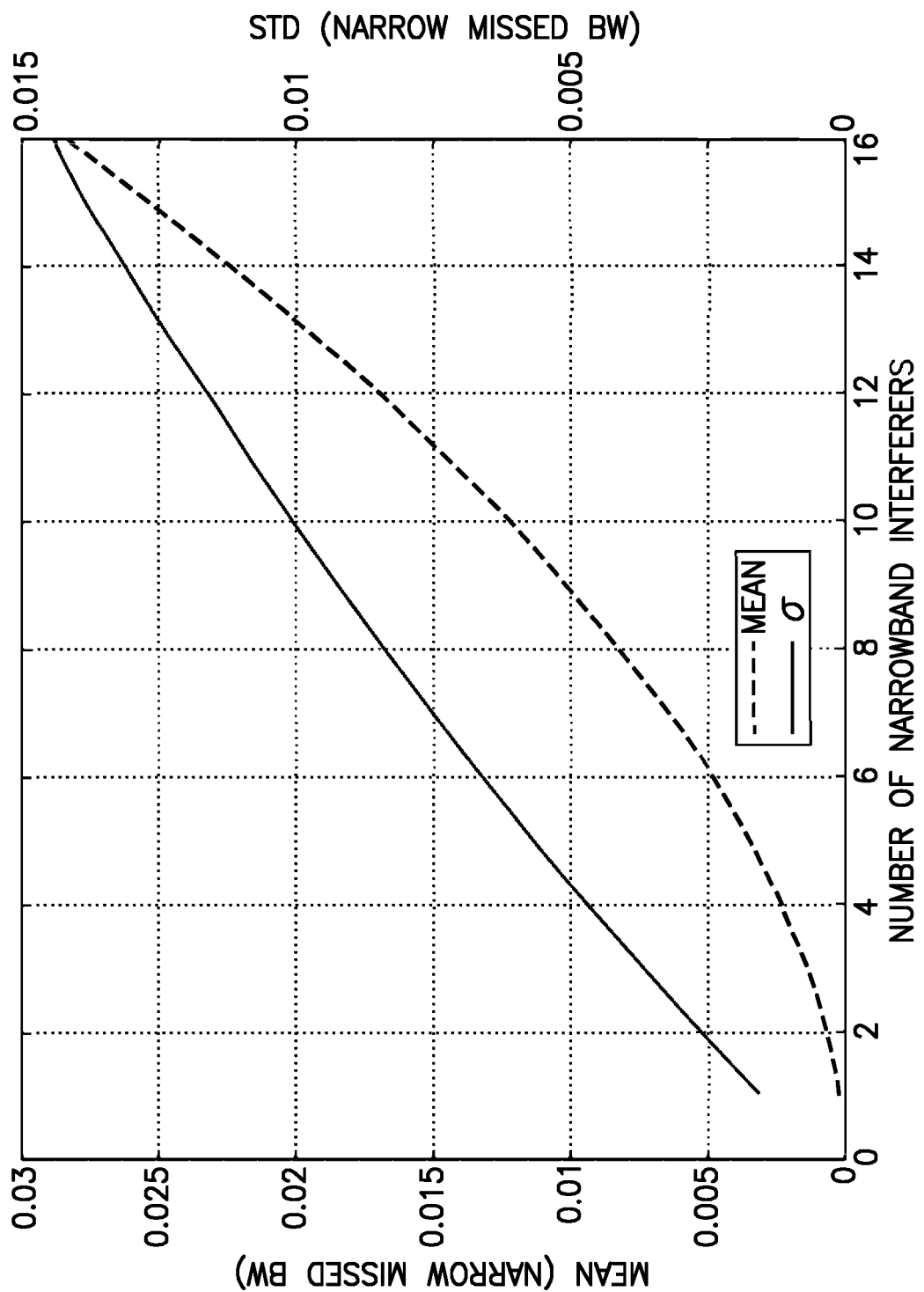
FIG. 16 is a graph showing the mean and standard missed narrow-bandwidth coverage interference performance for the fifth simulation in which the RF front end has an 8-ADC frequency range and four filter levels.
Figure 17:
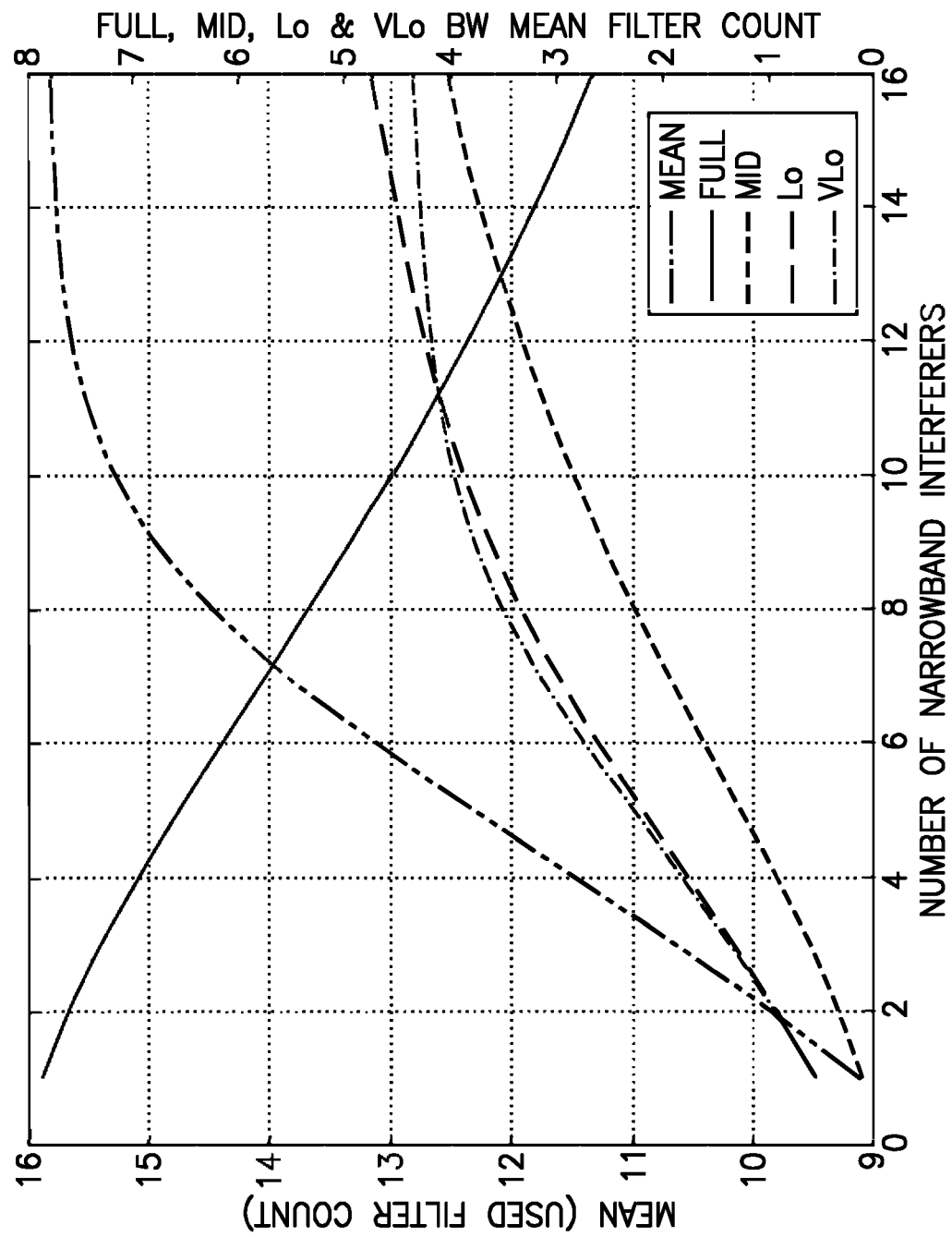
FIG. 17 is a graph showing the mean and standard used filter count performance for the fifth simulation in which the RF front end has an 8-ADC frequency range and four filter levels.

The final set of three graphs (FIGS. 15-17) show the further improvements when four filters are used per channel (called Full, Mid, Lo, and VLo). FIG. 15 shows the effects of having four filters per signal channel with the ability to select the best bandwidth and to move each fixed bandwidth filter around in frequency. Clearly the coverage has gone up even further, and the sixteen ADCs are being even more fully utilized from two RFSoCs. FIG. 16 shows the mean coverage missed because narrow-band sections (between two interferers) are closer than one-eighth ADC bandwidth apart and hence cannot be covered. FIG. 17 shows how many total filters are used as a function of the number of interferers and shows (on the right-hand side of the graph) how many filters are used of each type (Full, Mid, Lo and VLo).

Although the above-described simulations all used the same filter bandwidths for each signal channel, it is often desirable to have some channels with narrower filters to further reduce the missed narrow bandwidth coverage. For example, the bandwidths of one switch filter 26 of the type depicted in FIG. 4 (having three fixed-bandwidth bandpass filters) may be as follows: $B1 = f_{max}$ to $(f_{max}+1)$ GHz; $B2 = f_{max}$ to $(f_{max}+2)$ GHz; and $B3 = f_{max}$ to $(f_{max}+0.5)$ GHz. In contrast, the bandwidths of another switch filter 26 of the same type may be as follows: $B1 = f_{max}$ to $(f_{max}+0.5)$ GHz; $B2 = f_{max}$ to $(f_{max}+1)$ GHz; and $B3 = f_{max}$ to $(f_{max}+0.25)$ GHz.

The normal condition is that the RFSoC receives a number of signals into its set of ADCs so that each channel has been down-converted and bandwidth-matched to each ADC. For example, an RFSOC receiver with eight 2-GHz ADCs could be set up so that ADC #1 receives signals in the frequency range 2-4 GHz, ADC #2 receives signals in frequency range bandwidth 4-6 GHz, etc. In total, such a RFSoC covers the frequency range 2-18 GHz. The RFSoC would then process this 16-GHz bandwidth in the desired manner for the application. So for example, the RFSoC could be processing this bandwidth searching for radar signals and would then output descriptions of each detected radar signal. Or the RFSoC could, for example, detect and demodulate a single extremely broadband communication signal that covers the entire 16 GHz of bandwidth. The innovative technology proposed herein is able to reliably digitize the entire bandwidth even in the presence of interfering signals that would saturate one or more ADCs and hence destroy the ability to process those signal channels.

However, it should be appreciated that the RFSoC is simply another name for an FPGA with multiple (e.g., eight) embedded ADCs. The development of RFSoCs is simply the reason why multiple ADCs are available for very little cost that are easy to use and allows much wider bandwidths to be processed very easily. But with that ease comes the problem of interfering signals saturating these very broadband ADCs and knocking out a significant portion of the digital processing. This is not nearly as great a problem with narrow-band systems for which interfering signals would likely be filtered out in the front end before the ADC.

Certain systems, apparatus, applications or processes have been described herein as including a number of circuitry blocks. A circuitry block may be a unit of distinct functionality that may be implemented as hardware or firmware to enable streaming calculations as disclosed herein.

The embodiments disclosed above use FPGAs. A field-programmable gate array is an integrated circuit designed to be configured by a customer or a designer after manufacturing. The FPGA configuration is generally specified using a hardware description language, similar to that used for an application-specific integrated circuit. They consist of a collection of logic cells called lookup tables (LUTs) surrounded by an interconnect fabric. The LUTs and fabric are programmable, providing a flexible system that can implement almost any digital algorithm.

While a programmable RF front-end design and algorithms for avoiding interference in a wideband ADC-based receiver have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A receiver comprising:
an antenna block configured to transduce impinging electromagnetic signals into electrical signals;
a signal conditioning block connected and configured to condition electrical signals received from the antenna block;
a down-converter block connected and configured to down-convert conditioned electrical signals received from the signal conditioning block, the down-converter block comprising a plurality of signal channels, wherein each signal channel comprises a respective mixer having an output, a respective switch filter connected to the output of the respective mixer, and a respective down-conversion mixer directly connected to an output of the respective switch filter;
a plurality of programmable frequency synthesizers respectively connected to the mixers the plurality of signal channels of the down-converter block;
a plurality of analog-to-digital converters (ADCs) respectively connected to the plurality of signal channels of the down-converter block; and
a field-programmable gate array (FPGA) connected to the plurality of ADCs, to the plurality of frequency synthesizers, and to the switch filters of the plurality of signal channels of the down-converter block, wherein the FPGA is configured to perform operations comprising:
commanding a frequency search over signals coming into the plurality of ADCs in order to derive interference frequencies of interference signals;
programming the down-converter block by selecting a set of mixer frequencies to be respectively sent to the plurality of frequency synthesizers and a set of bandwidths to be respectively sent to the switch filters, the set of mixer frequencies and the set of bandwidths being designed to remove the interference signals having respective interference frequencies in each signal channel, the selections being calculated to mitigate reductions in dynamic range in the plurality of ADCs due to the interference signals; and
processing digital signals received from the plurality of ADCs after the down-converter block has removed the interference signals.

2. The receiver as recited in claim 1, wherein the plurality of ADCs have respective adjacent narrow bandwidths that cover a wider bandwidth, the FPGA being configured to select mixer frequencies and bandwidths that enable the down-converter block to fit down-converted signals within the respective bandwidths of the ADCs.

3. The receiver as recited in claim 1, wherein programming the down-converter block comprises outputting respective filter selection logic signals to each switch filter of the switch filters.

4. The receiver as recited in claim 3, wherein each switch filter comprises:
a first switch connected to the respective mixer, the first switch being configured to change from a first state to a second state in response to receipt of a first filter selection logic signal by the respective switch filter;
a second switch connected to the respective down-conversion mixer, the second switch being configured to change from a first state to a second state in response to receipt of the first filter selection logic signal by the switch filter;
a first bandpass filter having a first bandwidth, the first bandpass filter connecting the second switch to the first switch when the first and second switches are in the first states; and
a second bandpass filter having a second bandwidth, the second bandpass filter connecting the second switch to the first switch when the first and second switches are in the second states.

5. The receiver as recited in claim 4, wherein:
the first switch is further configured to change from the first state to a third state in response to receipt of a second filter selection logic signal by the switch filter;
the second switch is further configured to change from the first state to a third state in response to receipt of the second filter selection logic signal by the switch filter; and
the switch filter further comprises a third bandpass filter having a third bandwidth, the third bandpass filter connecting the second switch to the first switch when the first switch and the second switch are in the third states.

6. The receiver as recited in claim 4, wherein the plurality of programmable frequency synthesizers are connected and configured to provide respective oscillator signals having selected mixer frequencies to the mixers of the plurality of signal channels of the down-converter block, wherein programming the down-converter block comprises outputting respective mixer frequency selection logic signals representing the selected mixer frequencies from the FPGA to the programmable frequency synthesizers.

7. The receiver as recited in claim 4, further comprising a local oscillator and a splitter having an input terminal connected to the local oscillator and a plurality of output terminals respectively connected to the respective down-conversion mixers of the down-converter block.

8. The receiver as recited in claim 3, wherein each signal channel of the down-converter block further comprises a low-pass filter connected to the down-conversion mixer and an amplifier connected to the low-pass filter and to a respective ADC of the plurality of ADCs.

9. The receiver as recited in claim 1, wherein the FPGA is configured to execute an interference reduction algorithm which is configured to generate filter selection logic signals and mixer frequency selection logic signals in dependence on the interference frequencies of detected interference signals.

10. The receiver as recited in claim 9, wherein the interference reduction algorithm solves a bin packing problem.

11. The receiver as recited in claim 1, wherein the FPGA is further configured to determine the interference frequencies of detected interference signals from internal measurements.

12. The receiver as recited in claim 1, wherein processing digital signals received from the plurality of ADCs comprises searching for radar signals and then outputting descriptions of each detected radar signal.

13. The receiver as recited in claim 1, wherein processing digital signals received from the plurality of ADCs comprises detecting and demodulating a single extremely broadband communication signal that covers an entire bandwidth of the ADCs.

14. The receiver as recited in claim 1, wherein the signal conditioning block comprises:
a wideband amplifier;
a splitter having an input terminal connected to the wideband amplifier and a plurality of output terminals; and
a plurality of signals channels respectively connecting the plurality of output terminals of the splitter to the plurality of signals channels of the down-converter block.

15. A method for processing signals from an antenna using a plurality of signal channels respectively connected to a plurality of analog-to-digital converters (ADCs), the signals being processed by a field-programmable gate array (FPGA) connected to the plurality of ADCs, the method being performed by the FPGA and comprising:
(a) commanding a frequency search over signals coming into the plurality of ADCs in order to derive interference frequencies of interference signals;
(b) executing an interference reduction algorithm that selects a set of mixer frequencies and a set of bandwidths designed to remove the interference signals in each signal channel of the plurality of signal channels, the selections being calculated to mitigate reductions in dynamic range in the plurality of ADCs due to the interference signals,
wherein a respective filter selection logic signal is generated and transmitted to a respective switch filter of a down-converter block,
wherein the down-converter block comprises the plurality of signal channels, wherein each signal channel comprises a respective mixer having an output, the respective switch filter connected to the output of the respective mixer, and a respective down-conversion mixer directly connected to an output of the respective switch filter; and
(c) processing digital signals received from the plurality of ADCs after the interference signals have been removed in the signal channels.

16. The method as recited in claim 15, wherein the FPGA is connected to receive digital signals from the plurality of ADCs.

17. The method as recited in claim 16, wherein step (b) comprises generating filter selection logic signals, including the respective filter selection logic signal, and mixer frequency selection logic signals in dependence on the interference frequencies of the interference signals, the method further comprising:
outputting the filter selection logic signals representing selected filters from the FPGA to respective switch filters in the plurality of signal channels;
outputting the mixer frequency selection logic signals representing the selected mixer frequencies from the FPGA to respective programmable frequency synthesizers; and
outputting respective oscillator signals having the selected mixer frequencies from the programmable frequency synthesizers to respective mixers in the plurality of signal channels.

18. The method as recited in claim 17, further comprising executing an interference reduction algorithm which is configured to generate the filter selection logic signals and the mixer frequency selection logic signals in dependence on the interference frequencies of detected interference signals.

19. A receiver comprising:
an antenna block configured to transduce impinging electromagnetic signals into electrical signals;
a signal conditioning clock connected and configured to condition electrical signals received from the antenna block;
a down-converter block connected and configured to down-convert conditioned electrical signals received from the signal conditioning block, the down-converter block comprising a plurality of signal channels arranged in parallel;
a plurality of programmable frequency synthesizers connected to the plurality of signal channels of the down-converter block;
a plurality of analog-to-digital converters (ADCs) respectively connected to the plurality of signal channels of the down-converter block; and
a field-programmable gate array (FPGA) connected to the plurality of ADCs, to the plurality of frequency synthesizers, and to the plurality of signal channels of the down-converter block, wherein the FPGA is configured to perform operations comprising:
commanding a frequency search over signals coming into the plurality of ADCs in order to derive interference frequencies of interference signals;
configuring the down-converter block by selecting a set of mixer frequencies to be respectively sent to the plurality of frequency synthesizers and a set of bandwidths to be respectively sent to the plurality of signal channels of the down-converter block, the mixer frequencies and the set of bandwidths being designed to remove the interference signals having respective interference frequencies in each signal channel, the selections being calculated to mitigate reductions in dynamic range in the plurality of ADCs due to the interference signals; and
processing digital signals received from the plurality of ADCs after the down- converter block has removed the interference signals,
wherein each signal channel of the down-converter block comprises a plurality of series-connected components, the series-connected components comprising a mixer having an output, a switch filter connected to the output of the mixer, a down-conversion mixer directly connected to an output of the switch filter, an image rejection low-pass filter connected to an output of the down-conversion mixer, and an amplifier connected to an output the image rejection low-pass filter, wherein the switch filter comprises:
a first switch connected to the mixer, the first switch being configured to change from a first state to a second state in response to receipt of a first filter selection logic signal by the switch filter;

a second switch connected to the down-conversion mixer, the second switch being configured to change from a first state to a second state in response to receipt of the first filter selection logic signal by the switch filter;
   a first bandpass filter having a first bandwidth, the first bandpass filter connecting the second switch to the first switch when the first and second switches are in the first states; and
   a second bandpass filter having a second bandwidth, the second bandpass filter connecting the second switch to the first switch when the first and second switches are in the second states.

20. The receiver as recited in claim 19, wherein:
the first switch is further configured to change from the first state to a third state in response to receipt of a second filter selection logic signal by the switch filter;
the second switch is further configured to change from the first state to a third state in response to receipt of the second filter selection logic signal by the switch filter; and
the switch filter further comprises a third bandpass filter having a third bandwidth, the third bandpass filter connecting the second switch to the first switch when the first and second switches are in the third states.

\* \* \* \* \*